(12) United States Patent
Vulpetti et al.

(10) Patent No.: US 12,043,491 B2
(45) Date of Patent: Jul. 23, 2024

(54) MODULAR CONVEYOR BELT WITH DEDICATED ACCESS ASSEMBLY

(71) Applicant: Laitram, L.L.C., Harahan, LA (US)

(72) Inventors: Matthew Vulpetti, Metairie, LA (US); Benson Hall, Harahan, LA (US); David Aaron van Schalkwijk, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 66 days.

(21) Appl. No.: 17/789,367

(22) PCT Filed: Jan. 5, 2021

(86) PCT No.: PCT/US2021/012152
§ 371 (c)(1),
(2) Date: Jun. 27, 2022

(87) PCT Pub. No.: WO2021/141883
PCT Pub. Date: Jul. 15, 2021

(65) Prior Publication Data
US 2023/0029989 A1 Feb. 2, 2023

Related U.S. Application Data

(60) Provisional application No. 62/957,441, filed on Jan. 6, 2020.

(51) Int. Cl.
*B65G 17/06* (2006.01)
*B65G 17/08* (2006.01)
*B65G 17/40* (2006.01)

(52) U.S. Cl.
CPC ............ *B65G 17/08* (2013.01); *B65G 17/40* (2013.01); *B65G 2207/12* (2013.01)

(58) Field of Classification Search
CPC ........ B65G 17/06; B65G 17/08; B65G 17/40; B65G 2207/12
USPC ......................................... 198/853
See application file for complete search history.

(56) References Cited

U.S. PATENT DOCUMENTS

| | | | |
|---|---|---|---|
| 4,222,483 A | 9/1980 | Wootton et al. | |
| 4,742,907 A | 5/1988 | Palmaer | |
| 4,972,942 A | 11/1990 | Faulkner | |
| 5,174,438 A | 12/1992 | Witham et al. | |
| 5,247,789 A | 9/1993 | Abbestam et al. | |

(Continued)

FOREIGN PATENT DOCUMENTS

| EP | 1487723 B1 | 12/2007 |
|---|---|---|
| WO | 2015025615 A1 | 2/2015 |

OTHER PUBLICATIONS

WO 2021/256929 A1, Van Der Ende, Dec. 2021.*

(Continued)

*Primary Examiner* — Douglas A Hess
(74) *Attorney, Agent, or Firm* — Catherine M. Bishop

(57) ABSTRACT

A dedicated access assembly for a conveyor belt forms a dedicated opening and closing point for the conveyor belt. The dedicated access assembly includes a female portion having one or more open hooks and a male portion including a hinge rod extending between linking elements. The open hook disengages from and engages the hinge rod to selectively open and close the conveyor belt. A latching mechanism can selectively lock the dedicated access assembly.

18 Claims, 28 Drawing Sheets

(56) References Cited

U.S. PATENT DOCUMENTS

| | | | |
|---|---|---|---|
| 6,161,685 A | 12/2000 | Stebnicki | |
| 6,499,587 B1 * | 12/2002 | Greve | B65G 17/08 |
| | | | 198/853 |
| 6,857,516 B1 | 2/2005 | Verdigets | |
| 7,255,227 B2 * | 8/2007 | Melancon | B65G 17/40 |
| | | | 198/853 |
| 7,367,447 B1 * | 5/2008 | Harrison | B65G 17/08 |
| | | | 198/850 |
| 7,494,006 B2 * | 2/2009 | Knott | B65G 17/42 |
| | | | 198/853 |
| 7,681,718 B2 | 3/2010 | Stebnicki et al. | |
| 7,878,323 B2 * | 2/2011 | Van Rees | B65G 17/08 |
| | | | 198/852 |
| 8,113,340 B1 * | 2/2012 | Smith | B65G 17/40 |
| | | | 198/853 |
| 9,162,818 B2 | 10/2015 | van den Berg et al. | |
| 9,212,003 B2 * | 12/2015 | Gabler | B65G 17/086 |
| 9,555,972 B2 * | 1/2017 | Ishikawa | B65G 17/40 |
| 9,889,992 B1 * | 2/2018 | Adomaitis | B65G 17/34 |
| 10,118,766 B2 | 11/2018 | Perdue et al. | |
| 10,155,625 B1 * | 12/2018 | Bogle | B65G 17/46 |
| 10,427,881 B2 | 10/2019 | Menke et al. | |
| 10,442,626 B2 | 10/2019 | Marshall et al. | |
| 10,486,908 B2 * | 11/2019 | Adomaitis | A47J 37/045 |
| 11,745,949 B2 * | 9/2023 | Ragan | B65G 15/48 |
| | | | 198/850 |
| 11,772,897 B2 * | 10/2023 | Guernsey | B65G 43/02 |
| | | | 198/853 |

OTHER PUBLICATIONS

WO 2022/098723 A1, Maclachlan et al., May 2022.*
Extended European Search Report, European Patent Application No. 21737976.7, mailed Apr. 11, 2024, European Patent Office, Munich Germany.

* cited by examiner

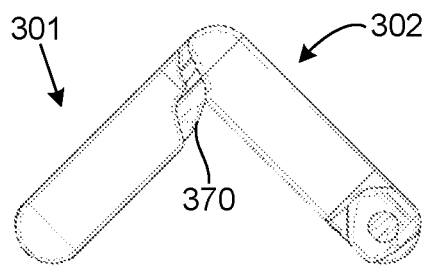 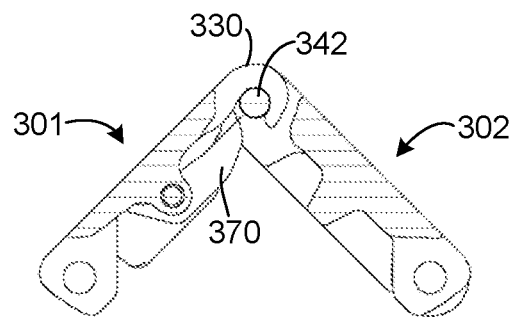
FIG. 29　　　　　　　　　FIG. 30
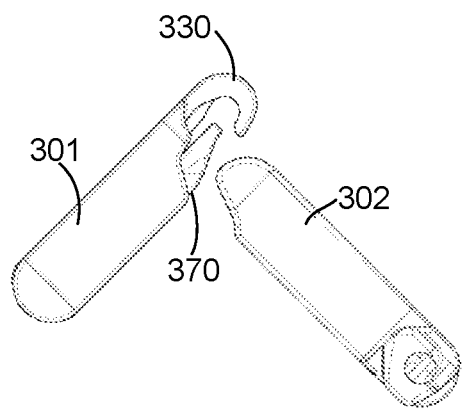 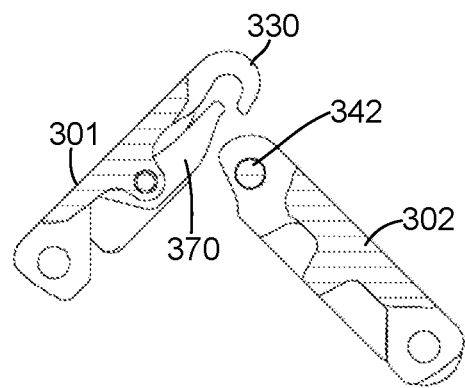
FIG. 31　　　　　　　　　FIG. 32

MODULAR CONVEYOR BELT WITH DEDICATED ACCESS ASSEMBLY

RELATED APPLICATIONS

The present application claims priority to US Provisional Patent Application Ser. No. 62/957,441, filed Jan. 6, 2020 and entitled "Modular Conveyor Belt with Master Link Assembly", the contents of which are herein incorporated by reference.

FIELD OF THE INVENTION

The present invention relates to the field of power-driven conveyors. More particularly, the present invention relates to a modular conveyor belt with a dedicated access assembly for easily separating and reconnecting the modular conveyor belt at a dedicated location.

BACKGROUND OF THE INVENTION

Modular plastic conveyor belts are widely used in various industries to convey products. Modular plastic conveyor belts are constructed of a series of rows of linked belt modules forming an endless loop. Hinge elements along opposite ends of each row interleave with hinge elements of consecutive rows. A hinge rod inserted in the interleaved hinge elements connects the rows together at hinge joints into an endless conveyor belt loop, allowing articulation of the modules relative to each other.

Dedicated access assemblies can be used in certain locations throughout the length of a conveyor belt to allow an operator to easily separate the belt, make repairs or remove sections, and then reconnect the belt without the need for replacement components or special tools.

SUMMARY OF THE INVENTION

A dedicated access assembly for a conveyor belt comprises female and male components capable of unhooking and re-hooking to each other. The female component includes at least one open hook that engages a hinge rod in the male component. The dedicated access assembly facilitates opening and rejoining of the conveyor belt at one or more dedicated locations.

According to one aspect, a dedicated access assembly for a conveyor belt comprise at least one female portion having a body extending in height from a top conveying surface to an opposite bottom surface, in width from a first side to a second side and in length from a first end to a second end, at least one open hook extending from the first end and a series of articulatable hinge elements extending from the second end and at least one male portion.

The male portion has a body extending in height from a top conveying surface to an opposite bottom surface, in width from a first side to a second side and in length from a first end to a second end, a series of articulatable hinge elements extending from the first end and a series of linking elements on the second end having a hinge rod for releasably engaging the open hook.

According to another aspect, a dedicated access assembly for a conveyor belt comprises a first module, a second module, a third module, a fourth module, a first hinge rod and a second hinge rod. The first module forms an edge of the conveyor belt and comprises a body, a first set of hinge elements extending from a first end for connecting to a standard conveyor belt module and a second set of hinge elements extending from a second end. The second module also forms the edge of the conveyor belt and comprises a body, a third set of hinge elements extending from a first end for connecting to the second set of hinge elements and an open hook extending from a second end. The third module is laterally inwards of the second module and comprises a body, a fourth set of hinge elements extending from a first end for connecting to the second set of hinge elements of the first module and a fifth set of hinge elements extending from a second side. The fourth module also forms the edge of the conveyor belt, and comprises a body, a sixth set of hinge elements extending from a first end and a seventh set of hinge elements for connecting to a standard conveyor belt module. The first hinge rod extends through the second, third and fourth sets of hinge elements to hingedly connect the first module, second module and third modules together. The second hinge rod extends through the fifth and sixth sets of hinge elements, so that the open hook snaps onto the second hinge rod to selectively lock the second module to the second hinge rod. The second module can pivot about the first hinge rod to disengage the second module from the second hinge rod to expose the second hinge rod for removal.

BRIEF DESCRIPTION OF THE FIGURES

FIG. 29 is a side view of the dedicated access assembly of FIG. 21 in an openable position;

FIG. 30 is a cross-sectional view of the assembly of FIG. 29;

FIG. 31 is a side view of the dedicated access assembly of FIG. 29 after unlocking the female portion from the male portion;

FIG. 32 is a cross-sectional view of the assembly of FIG. 31;

DETAILED DESCRIPTION

Figure 1:
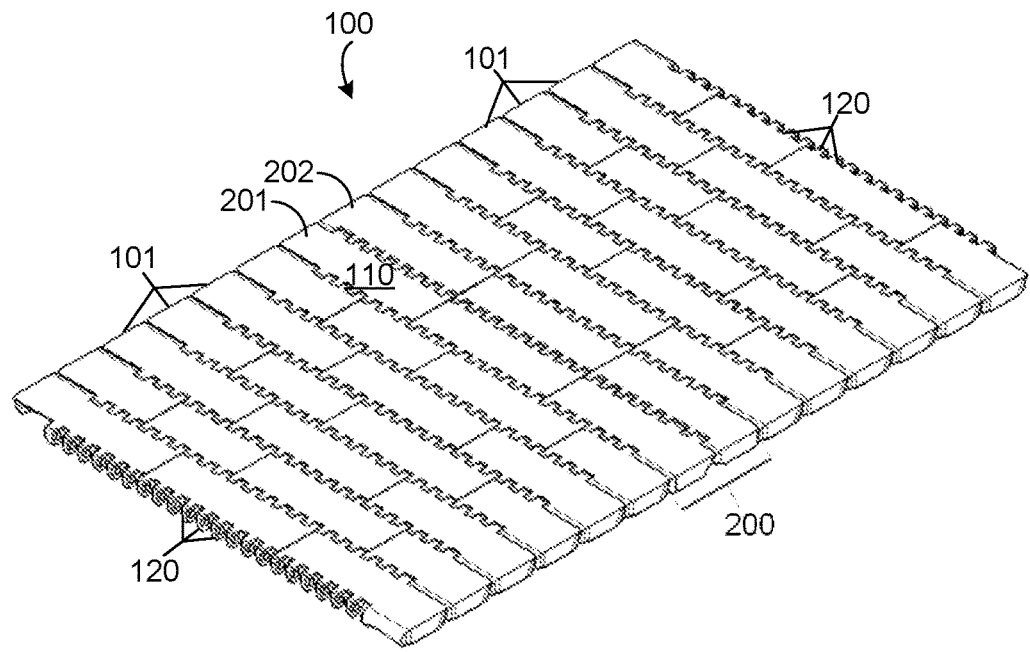
FIG. 1 is an isometric top view of a portion of a modular conveyor belt employing a dedicated access assembly according to one embodiment.

A modular conveyor belt includes a dedicated access assembly for easily separating and joining the belt at a dedicated location for cleaning, repair or removal. The invention will be described below relative to certain illustrative embodiments, though those skilled in the art will recognize that the invention is not limited to the illustrative embodiments.

Referring to FIGS. 1-6, an illustrative portion of a modular conveyor belt 100 comprises a series of hingedly connected standard conveyor belt modules 101 forming a top conveying surface 110 and having ends joined together to form a continuous loop that is driven by a drive, such as a sprocket. The modular conveyor belt 100 is made up of a series of rows, with each row consisting of multiple modules arranged side-by-side, typically in a brick-lay pattern from row to row, across the width of the belt. Alternatively, a row can comprise a single conveyor belt module defining the width of the belt. Examples of suitable modular conveyor belts are those manufactured and sold, for example, by Intralox, LLC of Harahan, LA., USA. The belt modules are conventionally made by injection-molding thermoplastic materials such as polypropylene, polyethylene, acetal, nylon, or composite polymers, to name a few, though other materials may be used.

Each standard conveyor belt module 101 comprises a body extending in thickness from a top conveying surface 110 to an opposite surface, which may include a drive element, such as a drive bar 112, for engaging a conveyor drive, such as a sprocket. The drive element can alternatively be located on the sides of the modules or in another suitable location, or comprise an opening or pocket in the module configured to engage a tooth on the drive. The standard module 101 extends in width from a first side to a second side and in length in a direction of belt travel from a first end to a second end. A series of linking elements, shown as spaced-apart hinge elements 120, extend longitudinally outward from each end of the standard module body. The hinge elements 120 on one end of the module body are laterally offset from the hinge elements 120 at the other end. The gaps between laterally consecutive hinge elements are sized to receive the hinge elements of modules in an adjacent row of modules in the conveyor belt, such that the openings in the hinge elements align to form a hinge passageway extending along a hinge axis. Hinge rods 130 extending laterally through the hinge passageways formed by the aligned openings in the interleaved hinge elements connect the standard modules 101 to each other.

The hinge elements 120 allow articulation of the modules relative to each other about the hinge rods 130, enabling the conveyor belt to conform to the sprocket or other belt-guiding devices. The distance between consecutive hinge axes is defined as the belt pitch P, which is also the distance between consecutive drive elements 112. Each illustrative standard conveyor belt module 101 includes articulating hinge elements 120 at each end.

The modular conveyor belt 100 conveys articles atop the conveying surfaces 110 of the modules along an upper carryway portion of the conveyor. The belt is trained around sprockets (or other reversing structure) mounted on each end of the carryway, and returns along a returnway below the carryway. Such standard conveyor belt modules 101 are known in the art and are not limited to the illustrative flat-top modules. One skilled in the art will recognize that the body of the modules may comprise any suitable configuration, and is not limited to the illustrative embodiment. For example, the body may comprise planar structure that is solid, perforated, "open grid," flat, shaped or otherwise configured.

In one or more select locations, a dedicated access assembly 200 is inserted between two standard modules 101 to provide a dedicated opening point and—or re-connecting point for the conveyor belt. The dedicated access assembly 200 comprises a series of mating female modules forming a female portion 201 and corresponding male modules 202 forming a male portion. The dedicated access assembly 200 is configured to be opened and—or closed without tools. Alternatively, a single male module and—or a single female module may span the width of the conveyor belt.

In one embodiment, the dedicated access assembly 200 can be a different color from the standard modules and—or contain indicia, such as signs, words or other markings, indicating that the dedicated access assembly 200 is the preferred place to open and—or close the conveyor belt 100 and—or providing instructions for opening and—or closing the conveyor belt.

Figure 2:
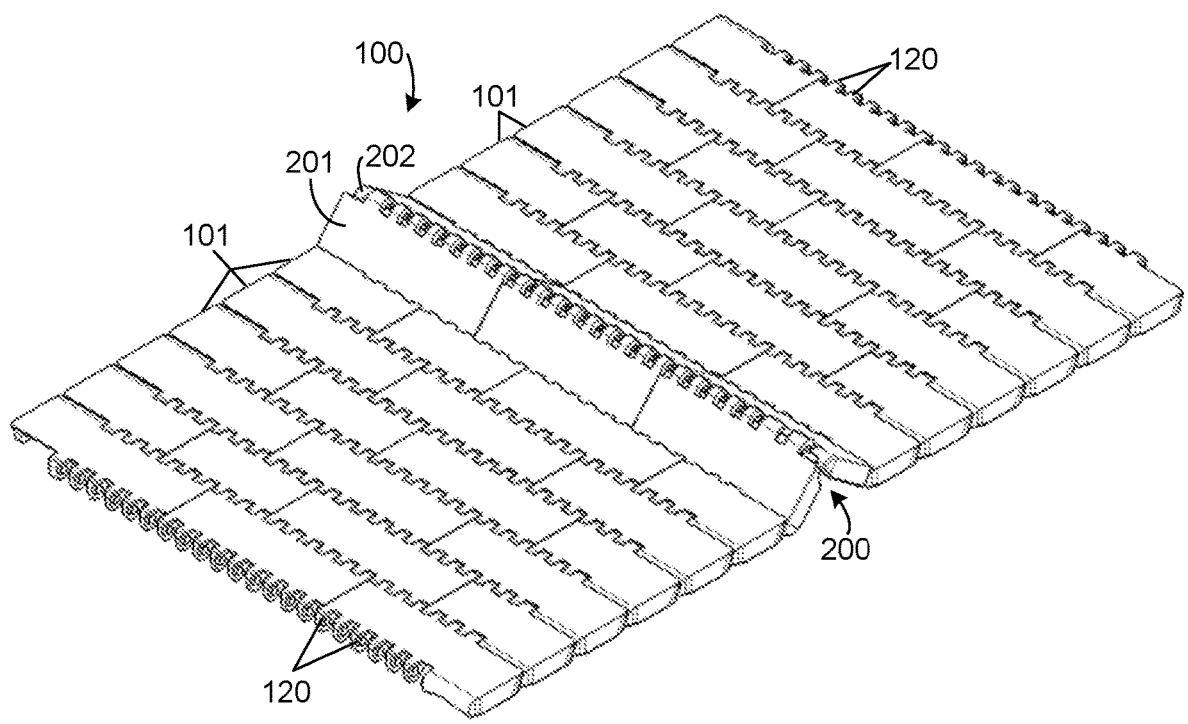
FIG. 2 is an isometric top view of the portion of FIG. 1 during opening of the conveyor belt using the dedicated access assembly.
Figure 3:
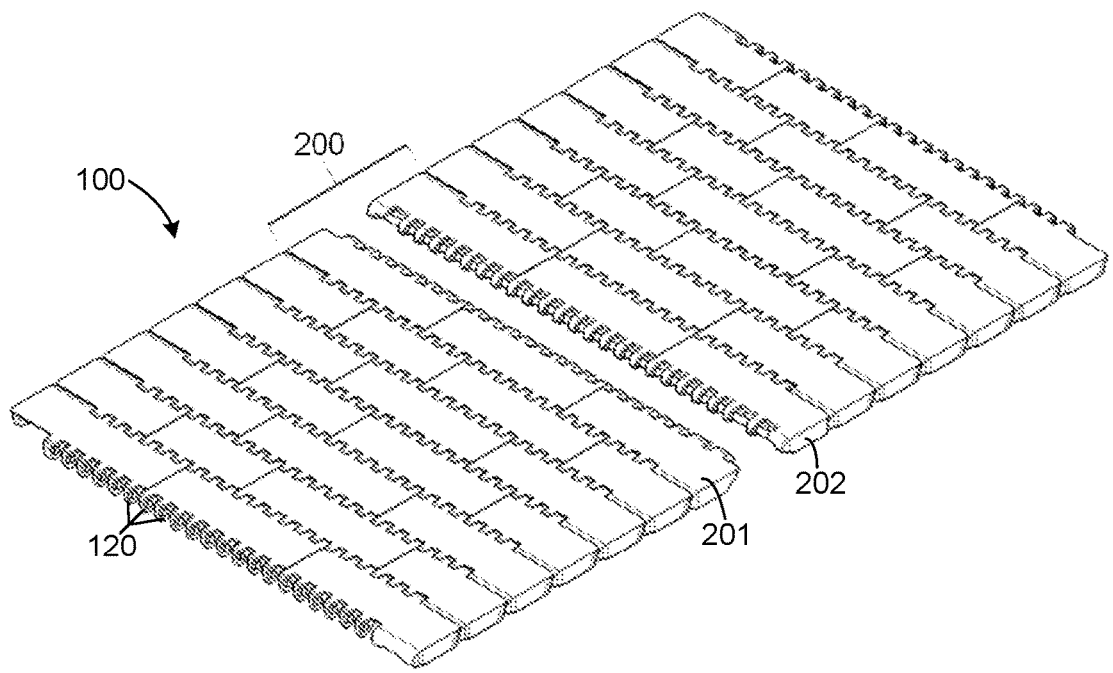
FIG. 3 is an isometric top view of the portion of FIG. 1 after separation of the dedicated access assembly components.
Figure 4:
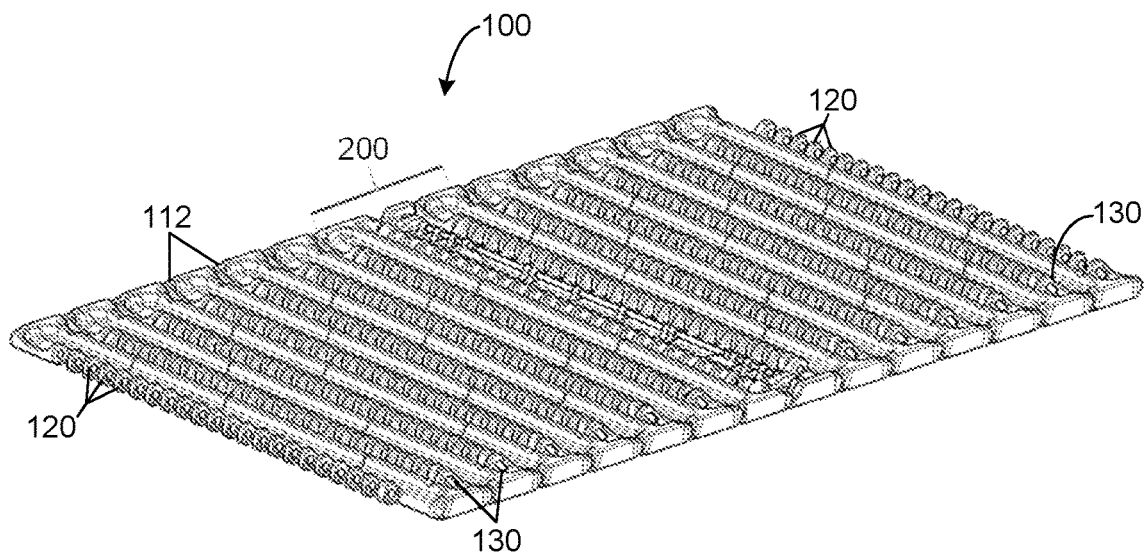
FIG. 4 is an isometric bottom view of the portion of the modular conveyor belt of FIG. 1.
Figure 5:
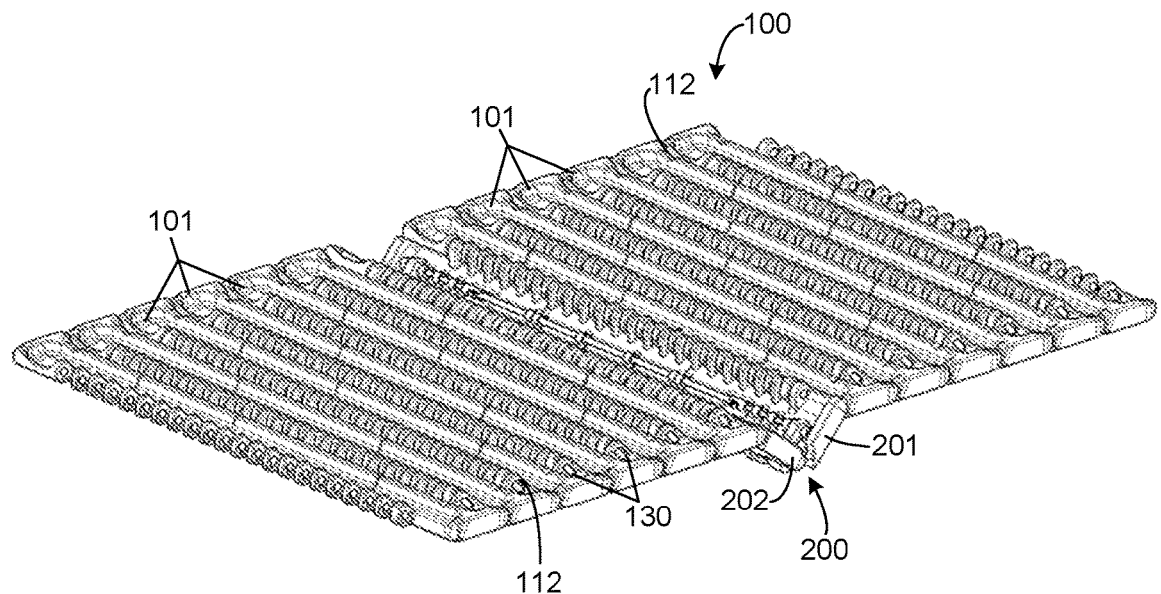
FIG. 5 is a bottom view of the portion of FIG. 2.
Figure 6:
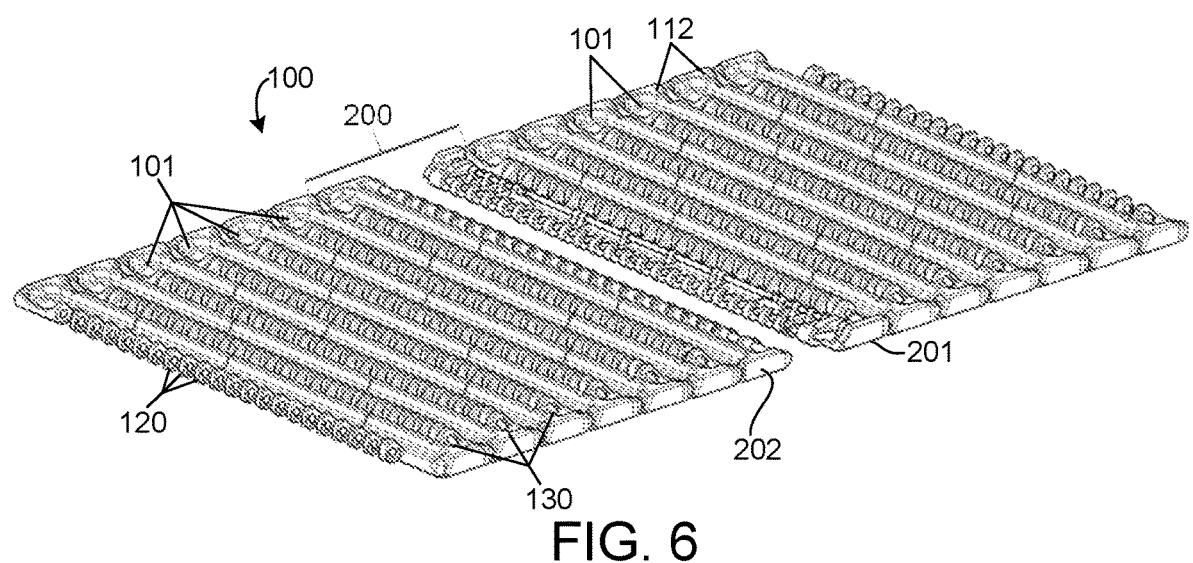
FIG. 6 is a bottom view of the portion of FIG. 3.

As shown in FIGS. 2, 3, 5 and 6, the dedicated access assembly 200 can open the conveyor belt by angling the female and male modules 201, 202 relative to each other into a separation orientation, shown in FIGS. 2 and 5, then unhooking the male and female modules 201, 202 from each other to open the conveyor belt, as shown in FIGS. 3 and 6. The illustrative male and female modules are configured to only be capable of unhooking and re-hooking when in the angled position.

Figure 7:
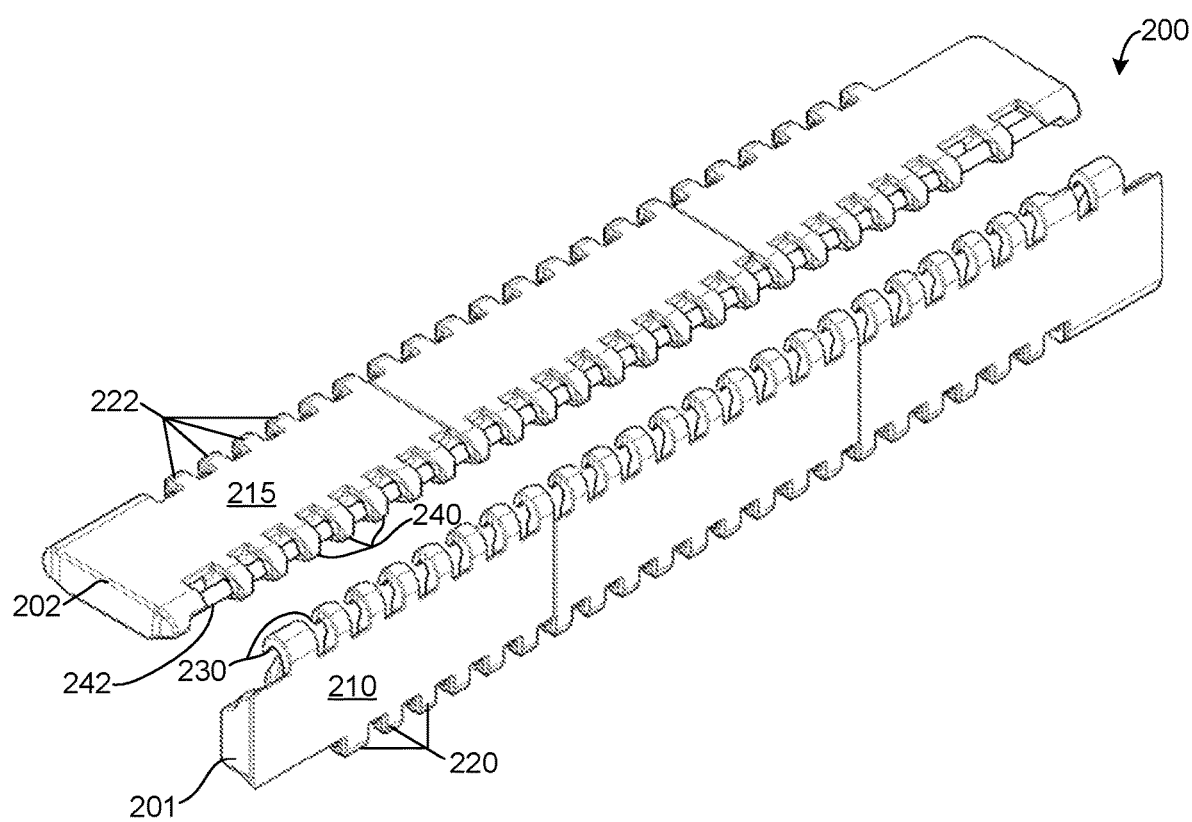
FIG. 7 is an isometric view of the dedicated access assembly of FIG. 1 during disassembly.
Figure 8:
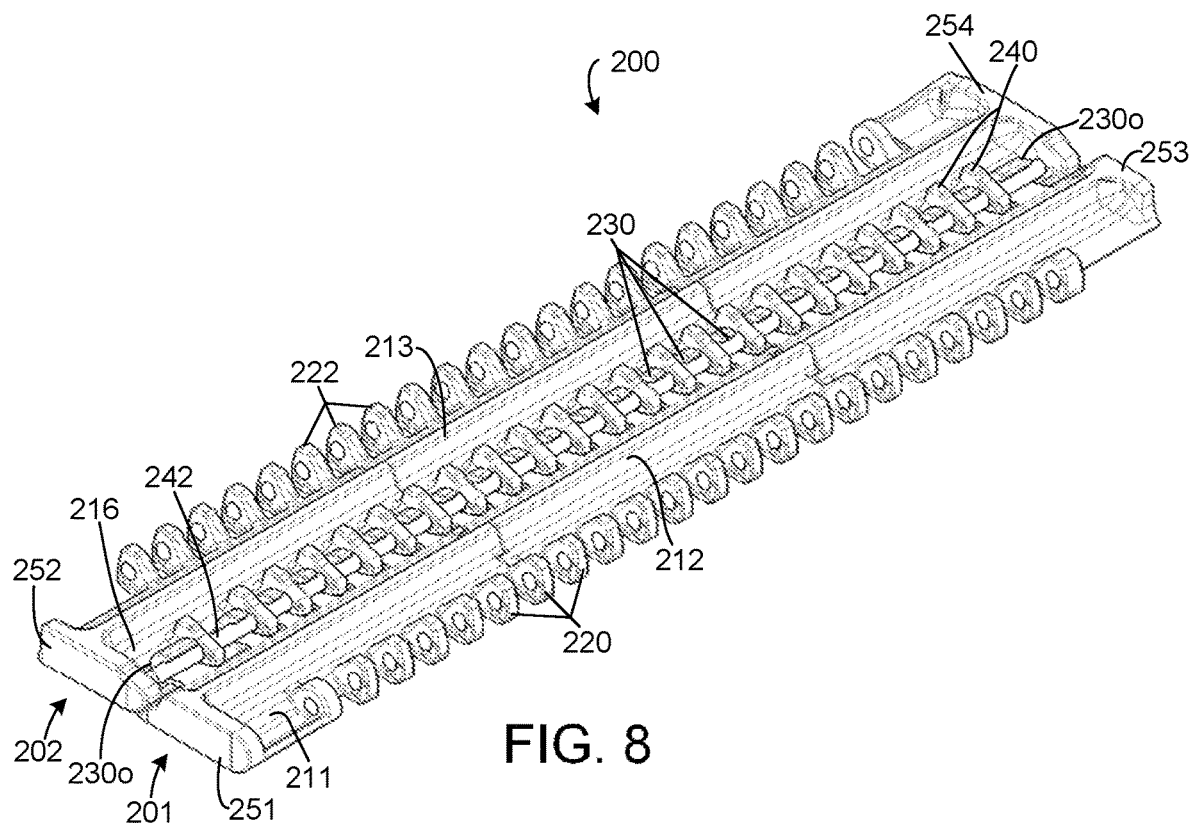
FIG. 8 is an isometric bottom view of the dedicated access assembly of FIG. 7 in an assembled position.
Figure 9:
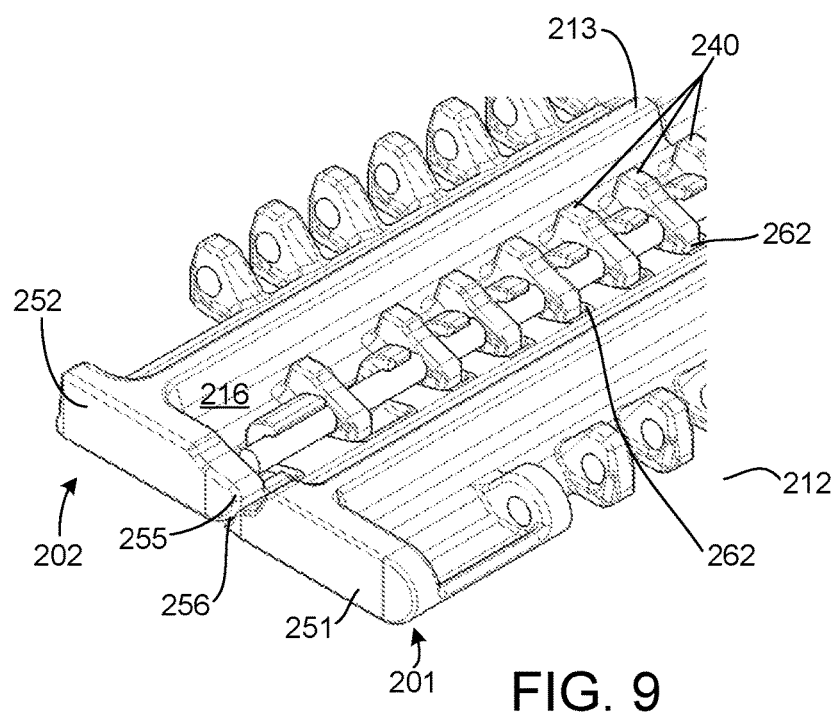
FIG. 9 is a detailed view of a side edge of the assembly of FIG. 8.

Referring to FIGS. 7-9, in one embodiment, a dedicated access assembly 200 comprises a series of female modules 201 forming a row of the conveyor belt. Alternatively, a single female module 201 may span the width of the conveyor belt. The female modules each comprise a body having a top surface 210 forming a portion of the top conveying surface, an opposite bottom surface 211 having a drive element 212 extending therefrom, standard hinge elements 220 on a first end of the body for connecting to a standard module 101 (or series of standard modules) in an articulatable manner and a series of open hooks 230 on a second end. The female modules 201 mate with a series of male modules 202 forming another row of the conveyor belt to form a dedicated opening and closing point for the conveyor belt. Alternatively, a single male module can span the width of the conveyor belt. The male modules 202 comprise a body having a top surface 215 forming a portion of the top conveying surface, an opposite bottom surface 216 including a drive element 213, male connecting elements 240 on a first end of the body for mating with the open hooks 230 of the female modules and standard hinge elements 222 on a second end for connecting to standard hinge elements 120 on standard module 101. The female and male module drive elements 212, 213 have a pitch equal to the pitch of the standard modules, so that the dedicated access assembly 200 engages a conveyor drive in the same manner as the standard modules.

At the side edges of the row, the female and male portions 201, 202 have a thickened section 251, 252, 253, 254 that extends in height from the top surfaces 210, 215 to a bottom surface coextensive with the bottom surface of the drive elements 212, 213. The male portion 202 of the dedicated access assembly includes rounded surfaces 255 at the front of thickened edges 252, 254 configured to abut shaped rear surfaces 256 on the thickened edges 251, 253 of the female portion 201. When the modules are flat relative to each other, as shown in FIGS. 8 and 9, the interference between the surfaces 255, 256 prevents the male and female rows 201, 202 from collapsing together.

In the illustrative embodiment, the outside open hooks 230o are thicker than the interior open hooks 230 in the series, but the invention is not so limited.

The male connecting elements 240 comprise shaped linking elements offset from the open hooks 230 and a trapped rod 242 extending through aligned openings of the shaped linking elements 240. The illustrative trapped rod is stainless steel, but the invention is not so limited. The thickened side edges 252, 254 of the male portion 202 trap the trapped rod 242 within the row. Alternatively, the rod 242 may be integrally formed with the male connecting elements 240.

Figure 10:
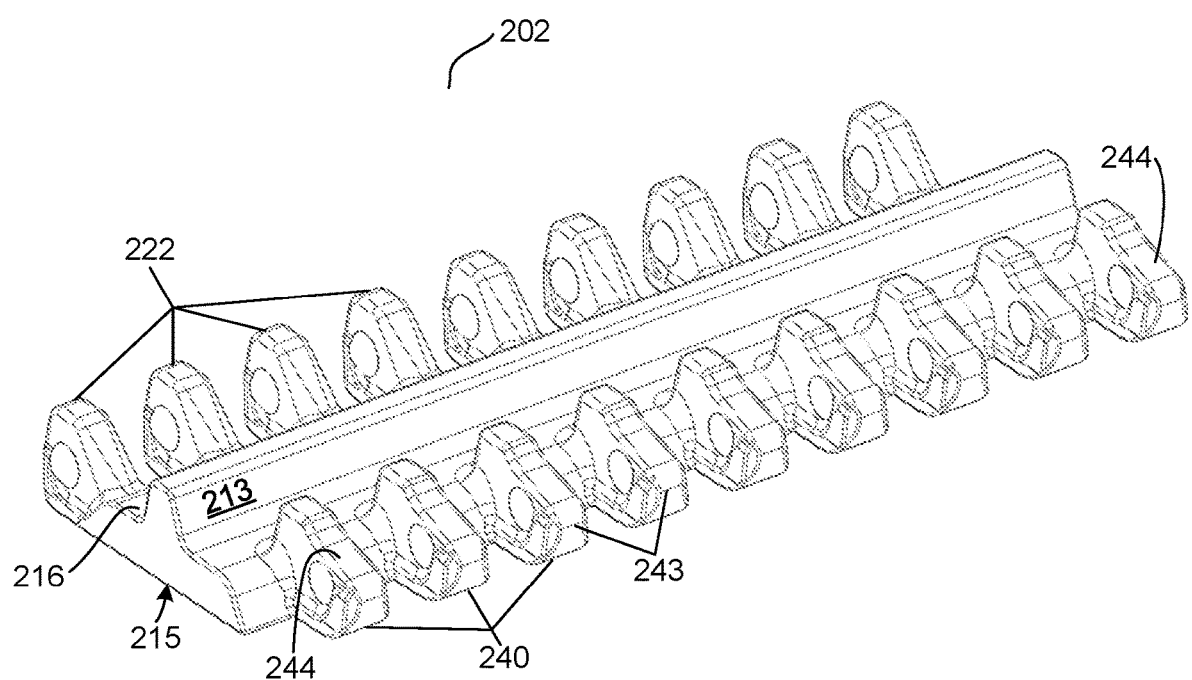
FIG. 10 is an isometric bottom view of an interior male portion of the dedicated access assembly of FIG. 8.

FIG. 10 is a bottom view of a middle portion of the series of male modules 202, showing the shaped linking elements 240. Each illustrative shaped linking element 240 comprises a tapered rounded end 243 configured to abut shaped end edges 262 of the female modules 201 between the open hooks 230 (shown in FIG. 9 and FIG. 12). The rounded ends 243 prevent the male and female rows from collapsing together. The bottom 244 of the shaped linking elements 240 is recessed to provide clearance for disengaging the open hooks 230 from the trapped rod 242.

Figure 11:
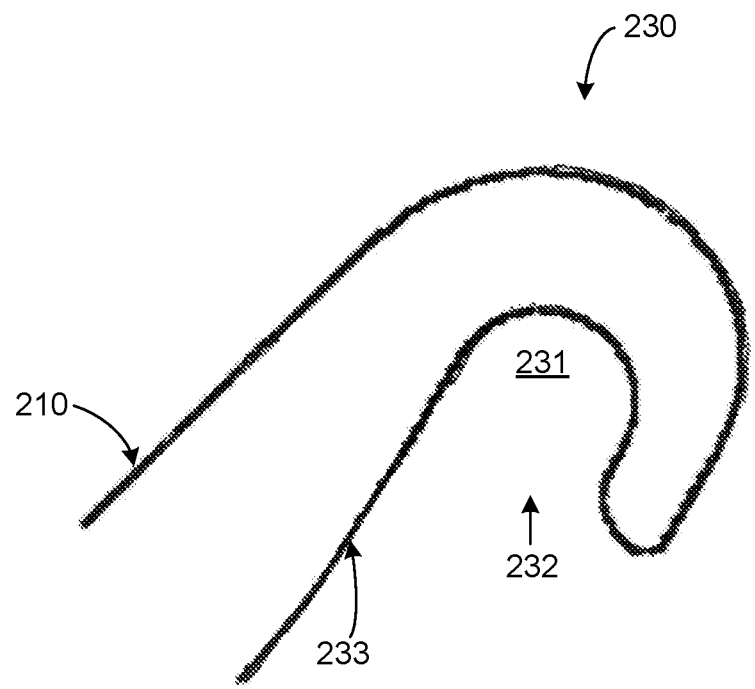
FIG. 11 is a detailed side view of an open hook of the female portion of the dedicated access assembly of FIG. 8.
Figure 12:
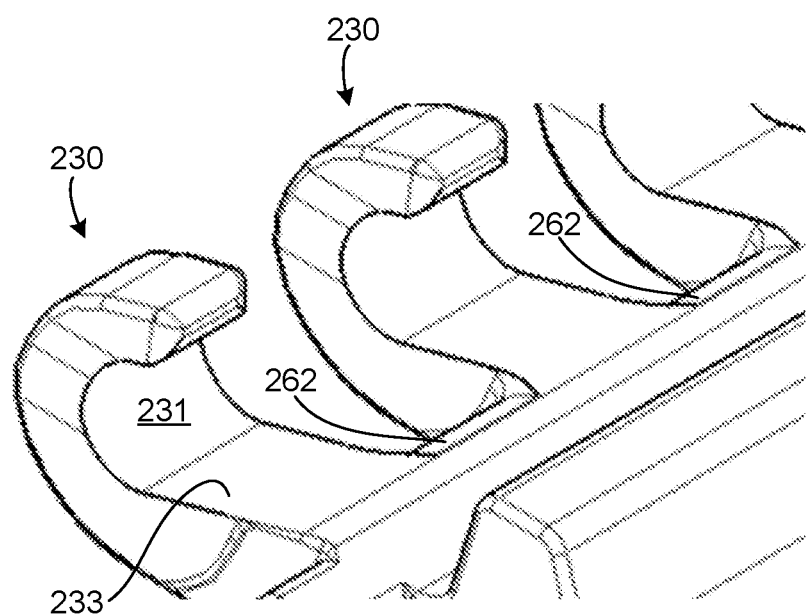
FIG. 12 is an isometric detailed view of a series of open hooks of the female portion of the dedicated access assembly of FIG. 8.

Referring to FIGS. 11 and 12, the open hooks 230 are configured to hook onto the trapped rod 242 in the spaces between the shaped linking elements 240 of the male module 202. The open hooks 230 have a round seat 231 sized and dimensioned to seat the trapped rod 242 and allow articulation of the modules relative to each other when the trapped rod 242 is seated in the open hook 230. An opening 232 to the seat 231 is sized so that the trapped rod 242 can enter and exit the seat at a particular angle, shown as about 45° relative to the top surface 210. An angled wall 233 forms a surface guiding the rod 242 into the seat 231.

Figure 13:
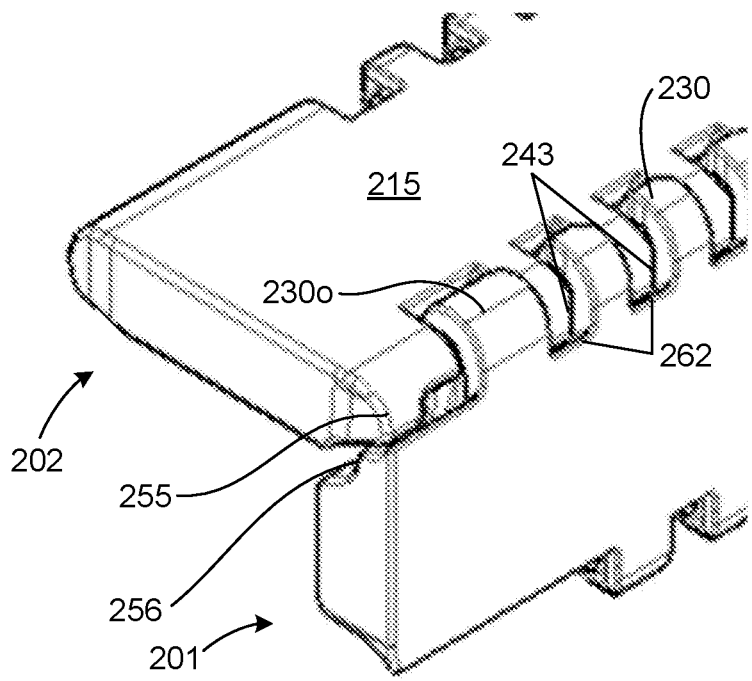
FIG. 13 is a detailed view of the side edge of FIG. 9 during disassembly of the dedicated access assembly.
Figure 14:
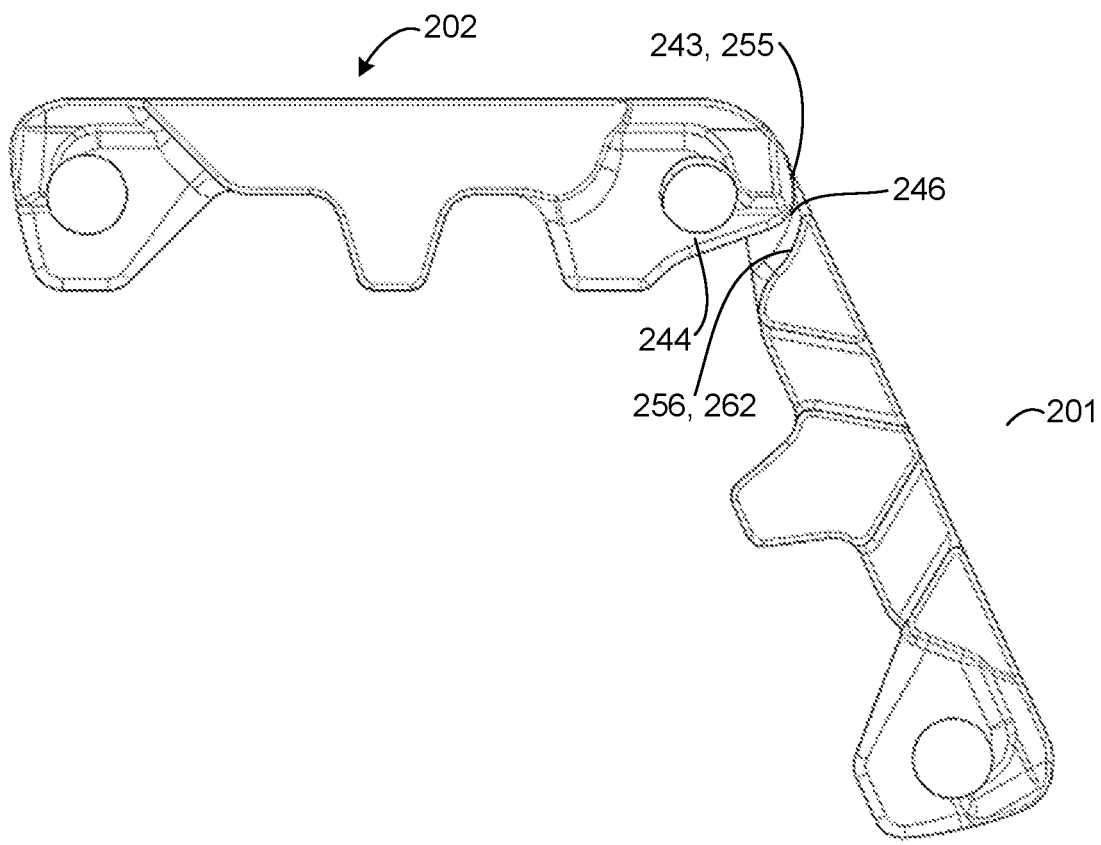
FIG. 14 is a side view of the dedicated access assembly of FIG. 8 during disassembly.
Figure 15:
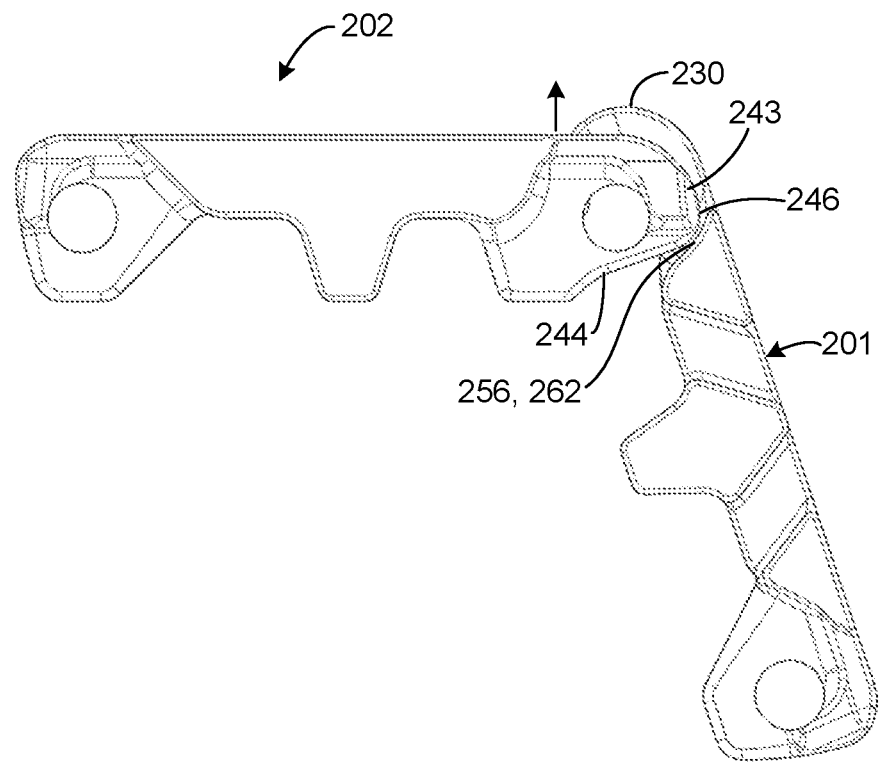
FIG. 15 is a side view of the dedicated access assembly of FIG. 8 after unlatching the open hooks.
Figure 16:
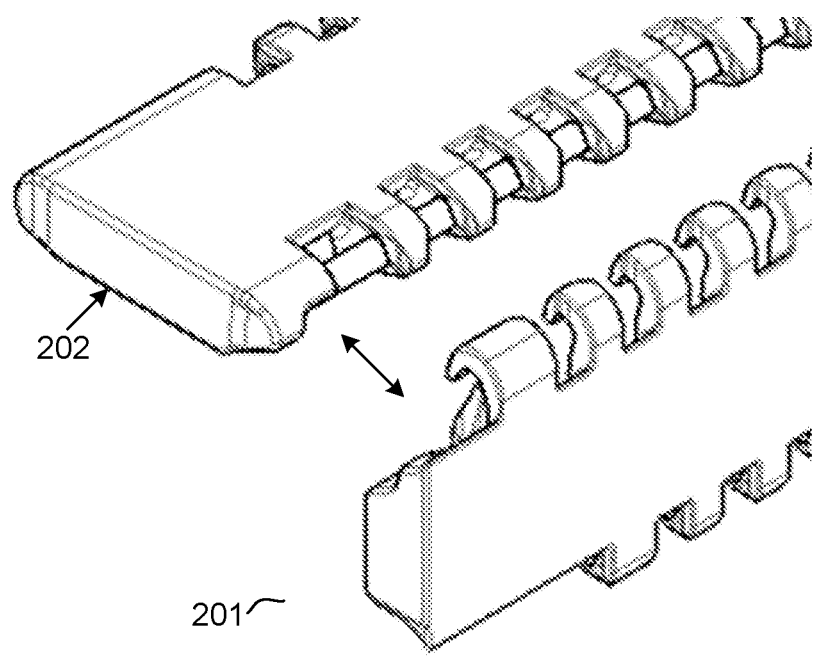
FIG. 16 is a detailed isometric view of the side edge of FIG. 9 after separation of the male and female portions.
Figure 17:
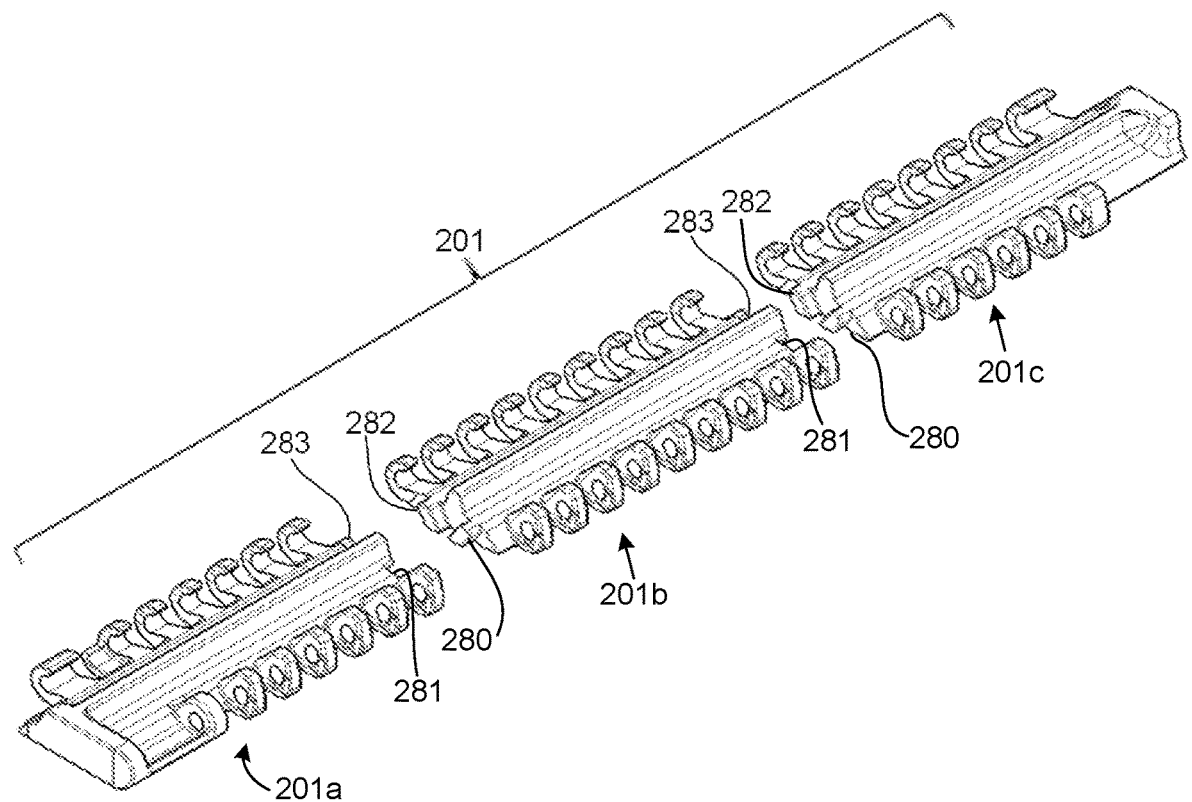
FIG. 17 is an exploded view of the bottom of the female portion of a dedicated access assembly showing alignment tabs used to align the components of the female portion.
Figure 18:
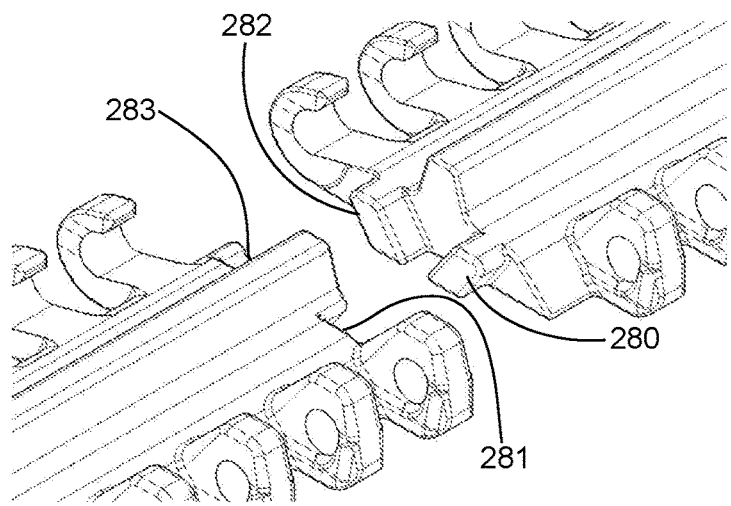
FIG. 18 is a detailed view of the alignment tabs of FIG. 17.
Figure 19:
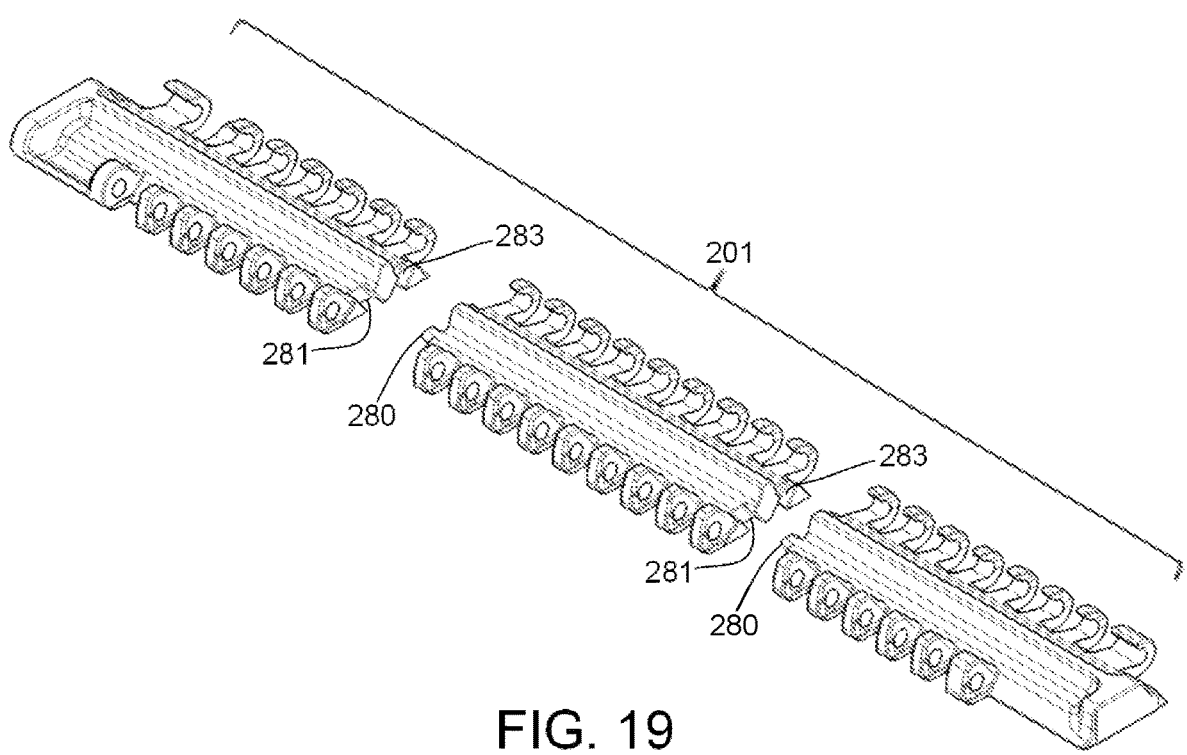
FIG. 19 is another exploded view of the bottom of the female portion of FIG. 17 showing the alignment tabs used to align the components.
Figure 20:
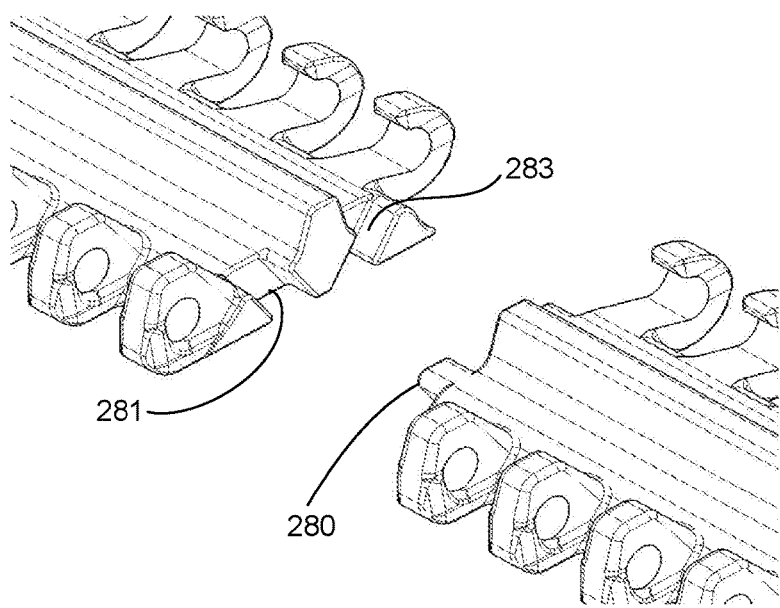
FIG. 20 is a detailed view of the alignment tabs of FIG. 19.

When the male and female portions 201, 202 are angled relative to each other, as shown in FIGS. 13 and 14, a user can manually disengage the open hooks 230 from the trapped rod 242 to open the belt, as shown in FIGS. 15 and 16. In the illustrative embodiment, the modules are configured to allow disengagement when the modules are bent about 90° relative to each other, but the invention is not so limited. At the selected angle, the shaped edges 256, 262 of the female portion 201 pass the rounded edges 243, 255 of the male portion 202, allowing the rows to collapse together and enabling a user to unhook the female portion 201 from the male portion 202. When shaped edges 256, 262 pass a release point 246 at the transition between the round surfaces 255, 243 and cut-out surface 244 on the bottom of the hinge elements 240, the rows can collapse together to enable the open hooks 230 to disengage from the trapped rod 242. The male and female portions may be shaped in any suitable manner to determine the angle at which the portions 201, 202 can disengage, and the invention is not limited to the illustrative shape and angle.

Referring to FIGS. 17-20, the illustrative series of female modules 201 comprises a first side module 201a, a middle module 201b and a second side module 201c. The female modules may include alignment tabs 280, 282 that engage corresponding recesses 281, 283 for aligning the modules to form the row. The male portion 202 may also comprises a series of modules connected using alignment tabs or another alignment feature. The illustrative alignment feature may be implemented in other areas of a conveyor belt, not limited to use in a dedicated access assembly.

Figure 21:
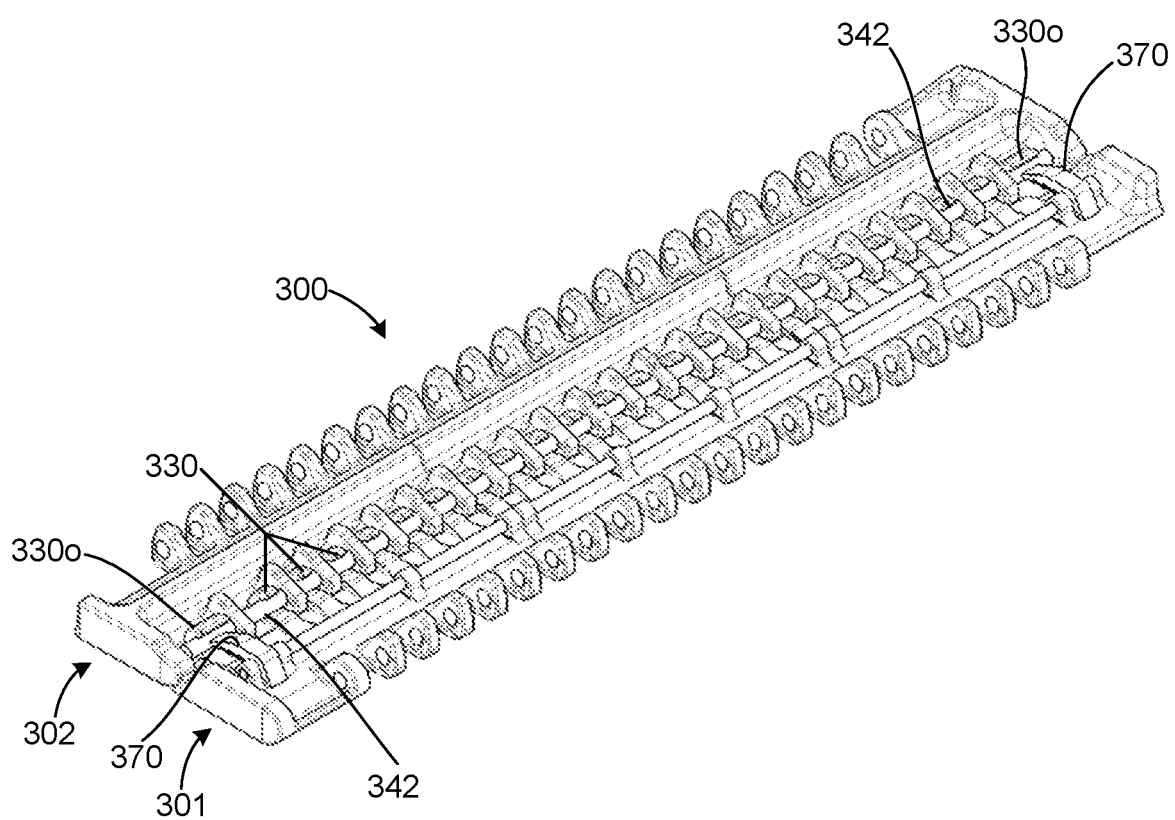
FIG. 21 is a bottom view of a dedicated access assembly including a latching mechanism according to another embodiment.

Referring to FIG. 21, in another embodiment, a dedicated access assembly 300 for a conveyor belt comprises a series of female modules 301 coupled to a series of male modules 302 and one or more latching mechanism 370 for selectively blocking the opening of at least one of the open hooks 330, shown as the outside open hooks 330o, to lock the open hooks onto a trapped hinge rod 342 to prevent separation of the modules. The illustrative series of male modules 302 is identical to the series 202 shown in FIGS. 1-20, but the invention is not so limited. The open hooks 330 are also the same size, shape, configuration and layout as the open hooks 230 of the female portion 201 described above.

Figure 22:
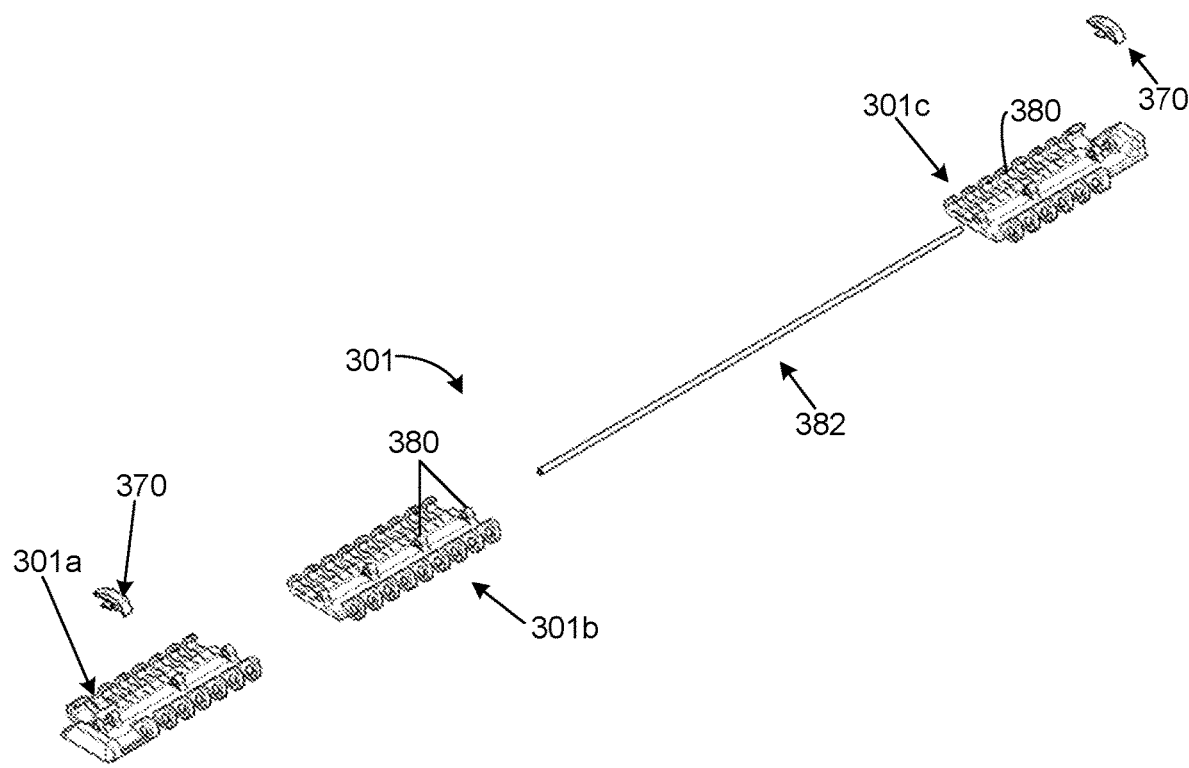
FIG. 22 is an exploded view of the dedicated access assembly of FIG. 21.

Referring to FIG. 22, the illustrative series of female modules 301 comprises a first side module 301a, a middle module 301b and a second side module 301c. A series of aligned stanchions 380 extends from a bottom surface of each module for receiving an alignment rod 382 to join the modules 301a, 301b, 301c together, maintain their alignment and form a complete row of the conveyor belt.

Figure 23:
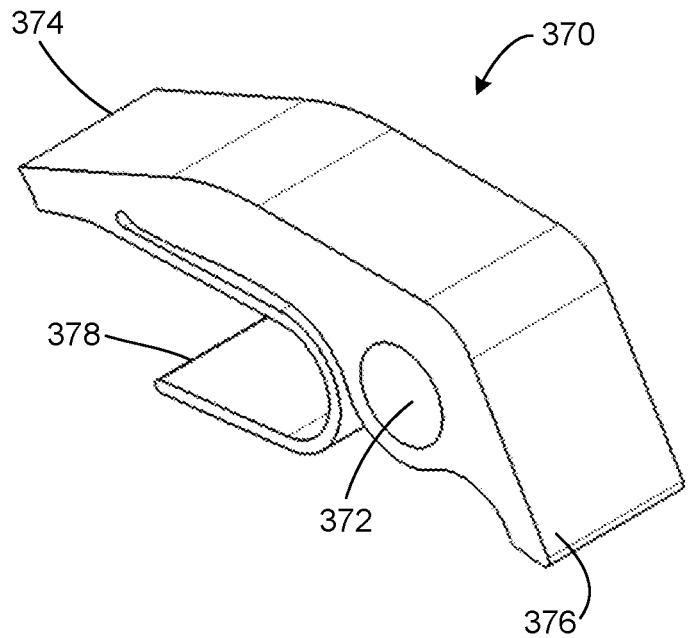
FIG. 23 is an isometric view of the latching mechanism of FIG. 21 in a natural, locking position.
Figure 24:
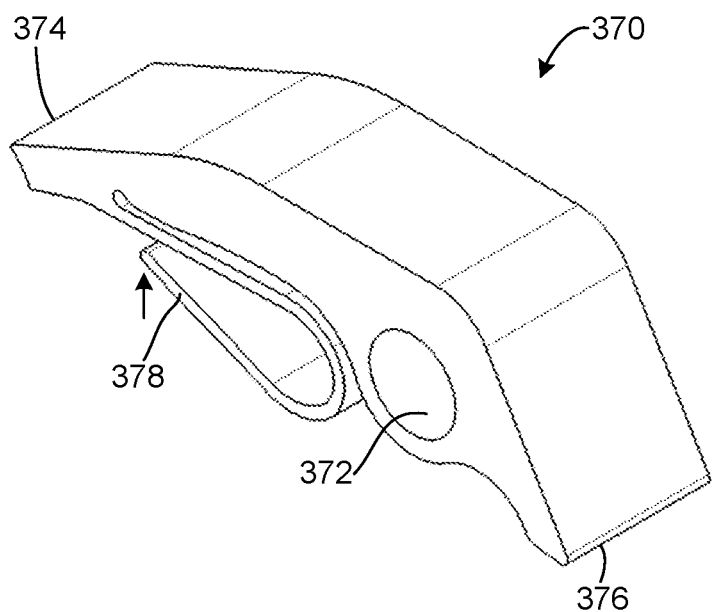
FIG. 24 shows the latching mechanism of FIG. 23 in a depressed, open position.

The illustrative latching mechanism 370, shown in detail in FIGS. 23 and 24, comprises a spring clip that is mounted on the alignment rod 382 between two suitably spaced stanchions 380. FIG. 23 shows the spring clip in a locking position and FIG. 24 shows the spring clip in an open, unlocked position. The spring clip 370 is naturally biased into the locked position of FIG. 23. The spring clip comprises a body having an opening 372 for receiving the alignment rod 382, upon which the spring clip 370 can rotate. The body terminates in a tip 374 for selectively blocking the opening of an open hook 330o and a base 376 that contacts the bottom surface of the module body. A biasing mechanism 378, shown as a leaf spring, extends between the opening 372 and tip 374. The leaf spring 378 has an upper span extending from and parallel to the body of the spring clip, a curve near the opening 372 and a bottom span that overlies the bottom surface of the module body. The leaf spring 378 biases the tip 374 away from the bottom surface of the module body, while the base 376 prevents overrotation of the spring clip on the alignment rod 382. The body of the spring clip can be pushed down, compressing the biasing mechanism.

Figure 25:
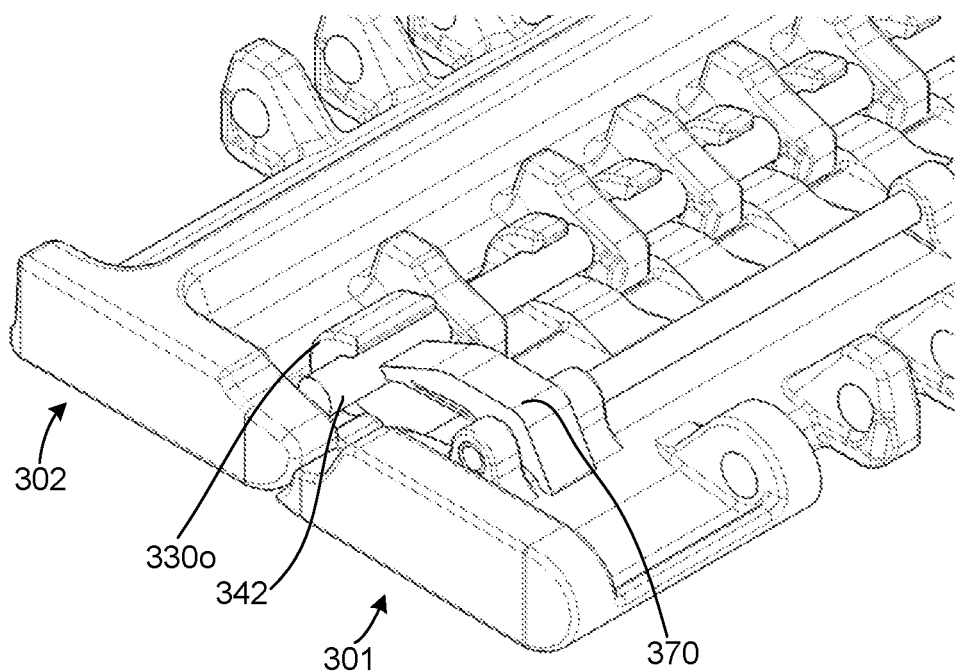
FIG. 25 shows a side edge of the dedicated access assembly of FIG. 21 in a locked position.
Figure 26:
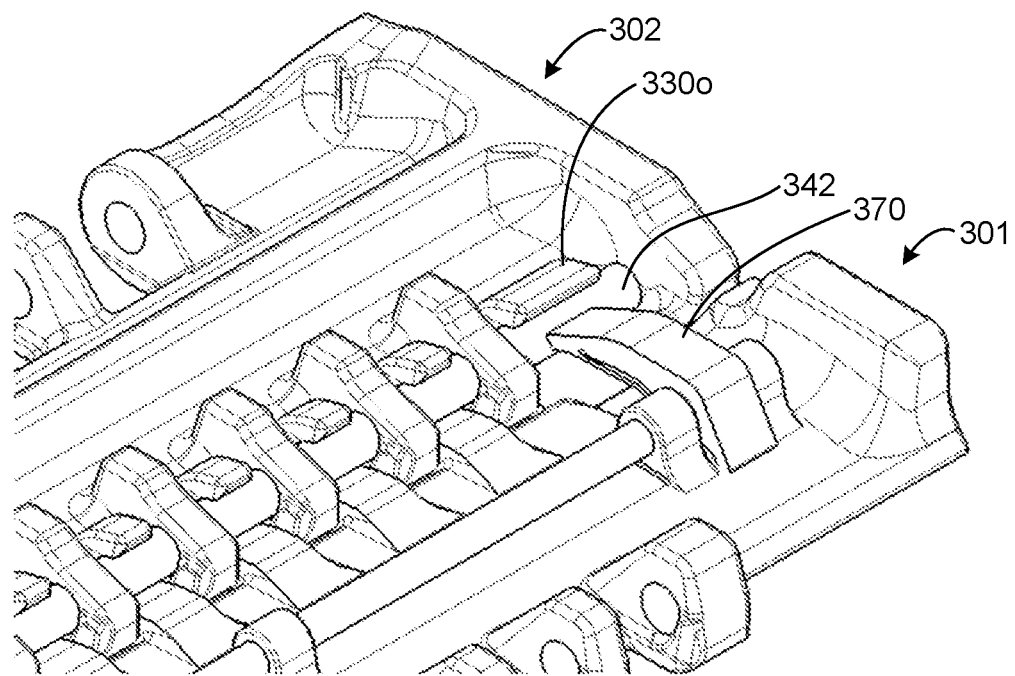
FIG. 26 shows another side edge of the dedicated access assembly of FIG. 21 in the locked position.
Figure 27:
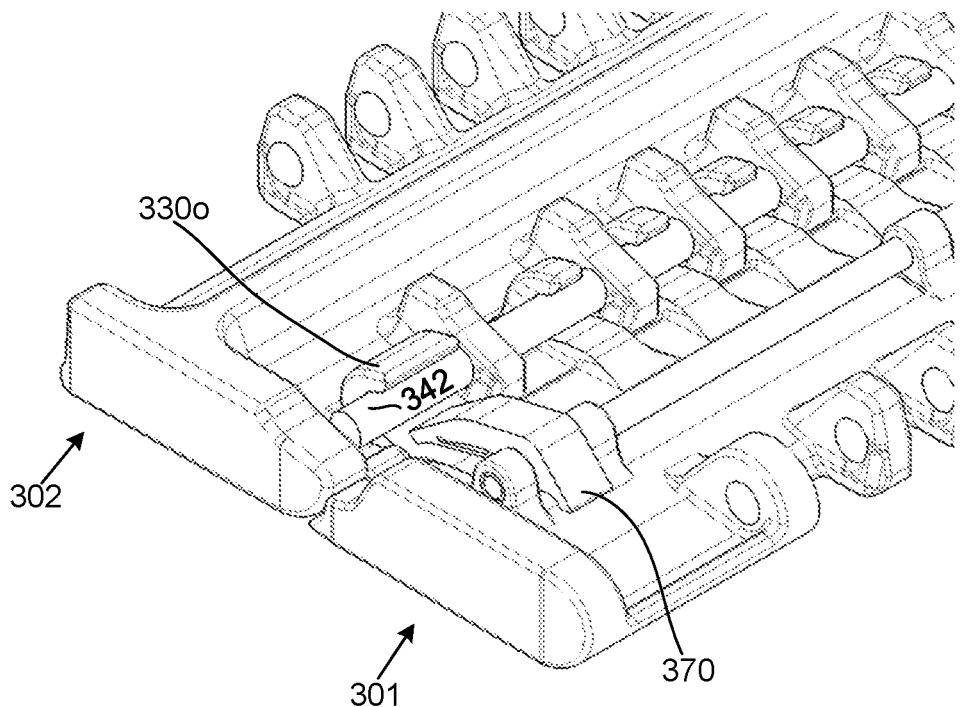
FIG. 27 shows the side edge of FIG. 25 in an unlocked position.
Figure 28:
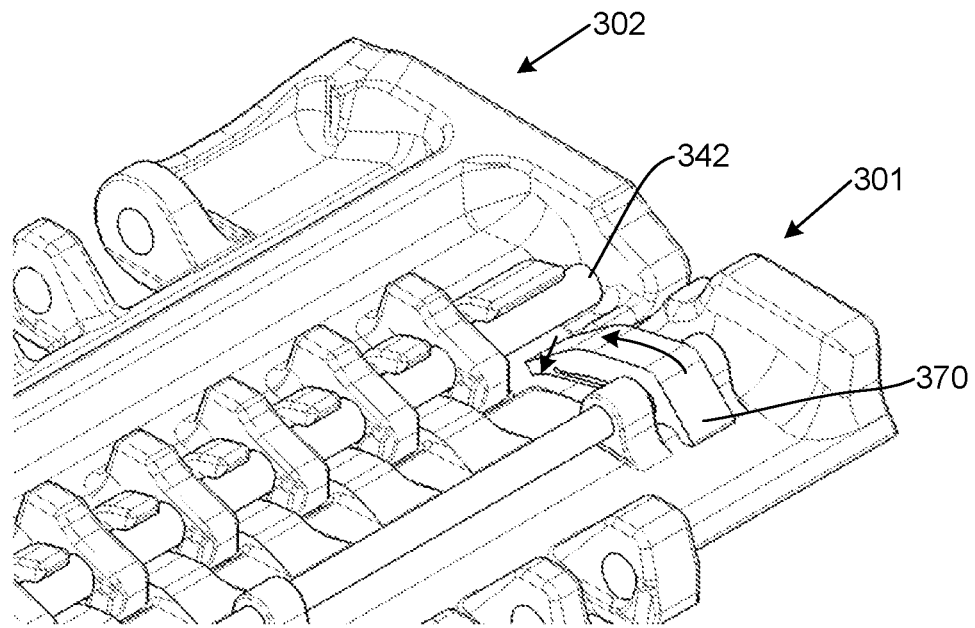
FIG. 28 shows the side edge of FIG. 26 in an unlocked position.

As shown in FIGS. 25 and 26, in the natural position, the spring clip 370 blocks the corresponding open hook 330o, locking the hinge rod 342 in place. To separate the female portion 301 from the male portion 302, a user depresses the spring clip 370 at each side of the row to open the hooks 330o, as shown in FIGS. 27 and 28 Then, the user angles the female portion 301 and male portion 302 relative to each other, as described above and shown in FIGS. 29 and 30, collapses the rows together and unhooks the female portion 301 from the male portion 302, as shown in FIGS. 31 and 32. The spring clip 370 returns to its natural position absent a force upon it. The female portion 301 can clip back onto the male portion 302 to close the conveyor belt, with the action of the hinge rod 342 pushing on the spring clip 370 automatically opening the open hooks 330.

Figure 33:
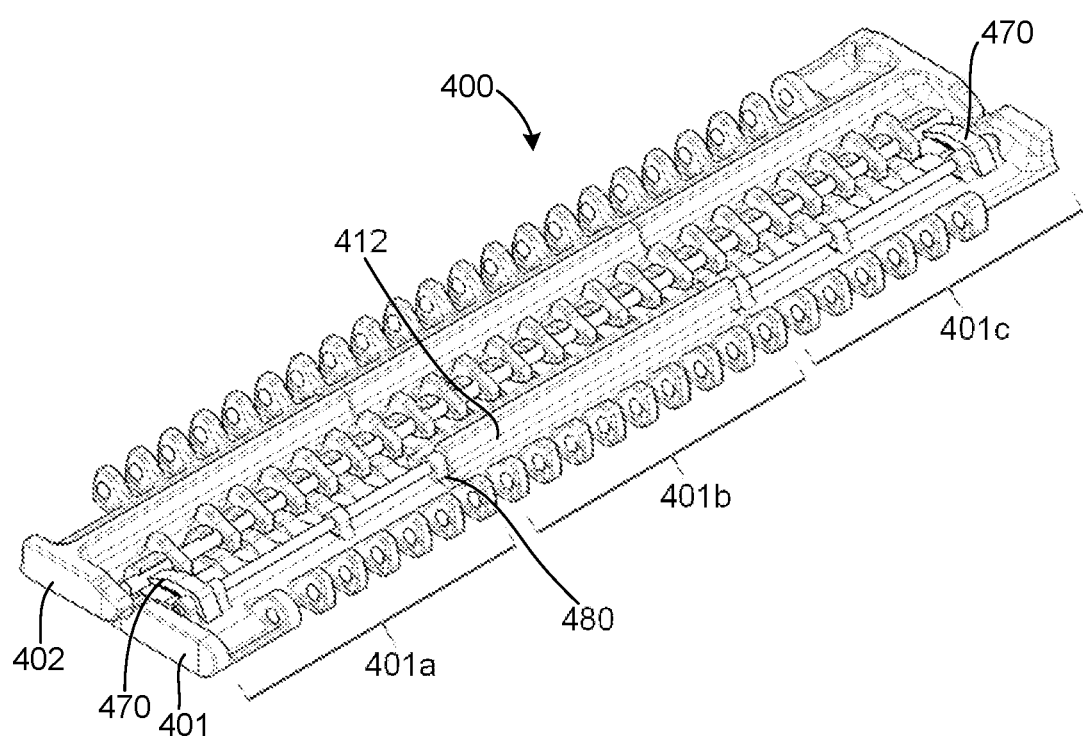
FIG. 33 is a bottom view of a dedicated access assembly including a latching mechanism and alignment tabs according to another embodiment.

As shown in FIG. 33, in another embodiment, a female portion 401 of a dedicated access assembly 400 includes edge modules 401a, 401c including spring clips 470 and at least one middle module 401b that include one or more alignment tabs 480 or other alignment features for aligning the middle module 401b with the edge modules 401a, 401c. The illustrative middle module 401b also includes a laterally-extending drive element 412 on a bottom surface for driving a conveyor belt including the dedicated access assembly 400. The illustrative male portion 402 is similar to the male portions 202, 302 described above and the other features of the female portion are similar to the features of the female portion 302 described above.

Figure 34:
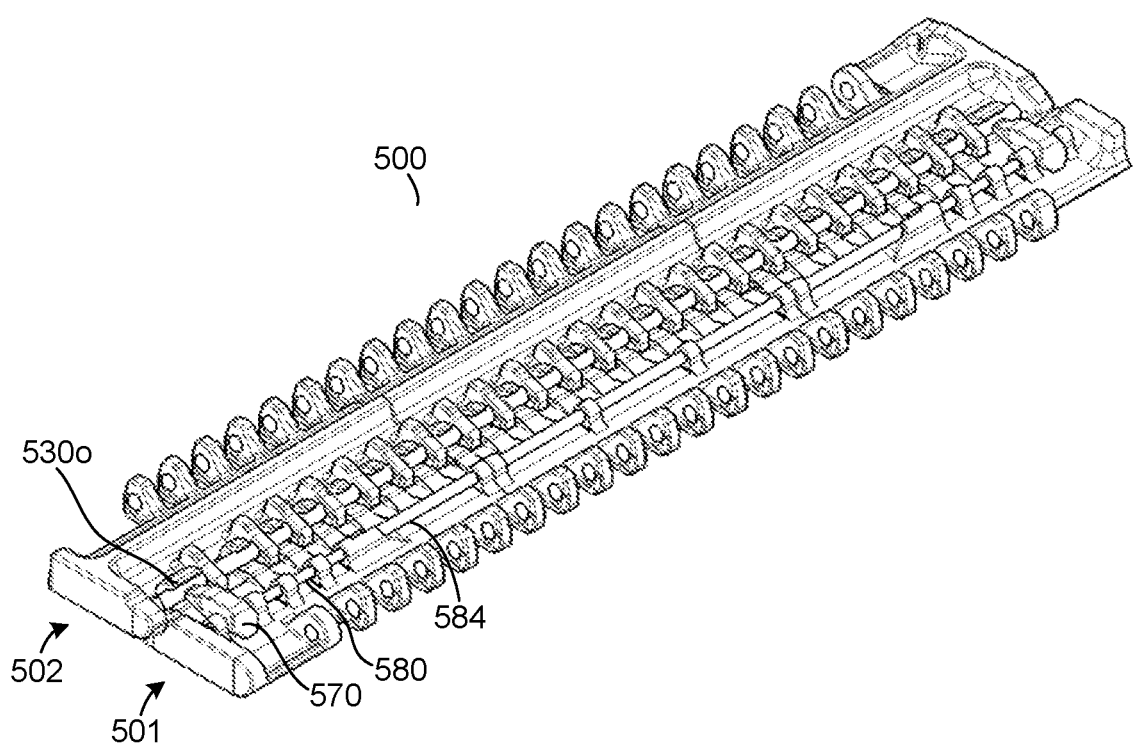
FIG. 34 is a bottom view of a dedicated access assembly including a latching mechanism according to another embodiment.

Referring to FIG. 34, in another embodiment, a dedicated access assembly 500 includes mating female and male portions 501, 502 and a latching mechanism comprising a torsion bar 580 and a lever 570 mounted on the torsion bar 580. The torsion bar 580 biases the lever 570 into a locking position, blocking the outside open hook 530o to prevent disengagement of the female and male portions 501, 502.

Figure 35:
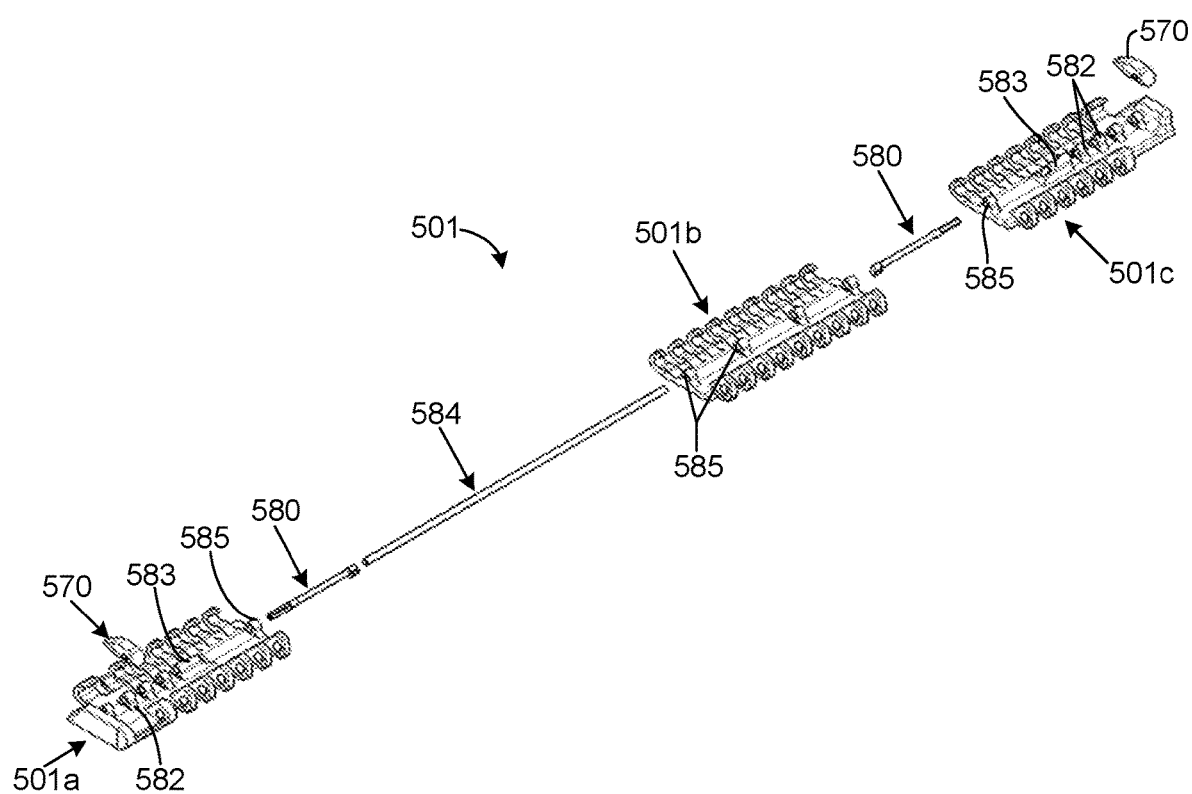
FIG. 35 is an exploded view of the dedicated access assembly of FIG. 34.

As shown in FIG. 35, the female portion 501 may comprise a series of aligned modules, including end modules 501a, 501c and middle module 501b that connect to form a row of the conveyor belt. Each end module 501a, 501c includes a torsion bar 580 rotatably mounted in and extending between aligned stanchions 582 and a base stanchion 583 in the middle of the module 501a, 501c. An alignment rod 584 extends through alignment stanchions 585 on the middle module 501b and the interior sides of the edge modules 501a, 501c and into the base stanchions 583 to connect and align the series of modules together to form a full row of the conveyor belt. Other alignment mechanisms, such as alignment tabs, may alternatively be used.

Figure 36:
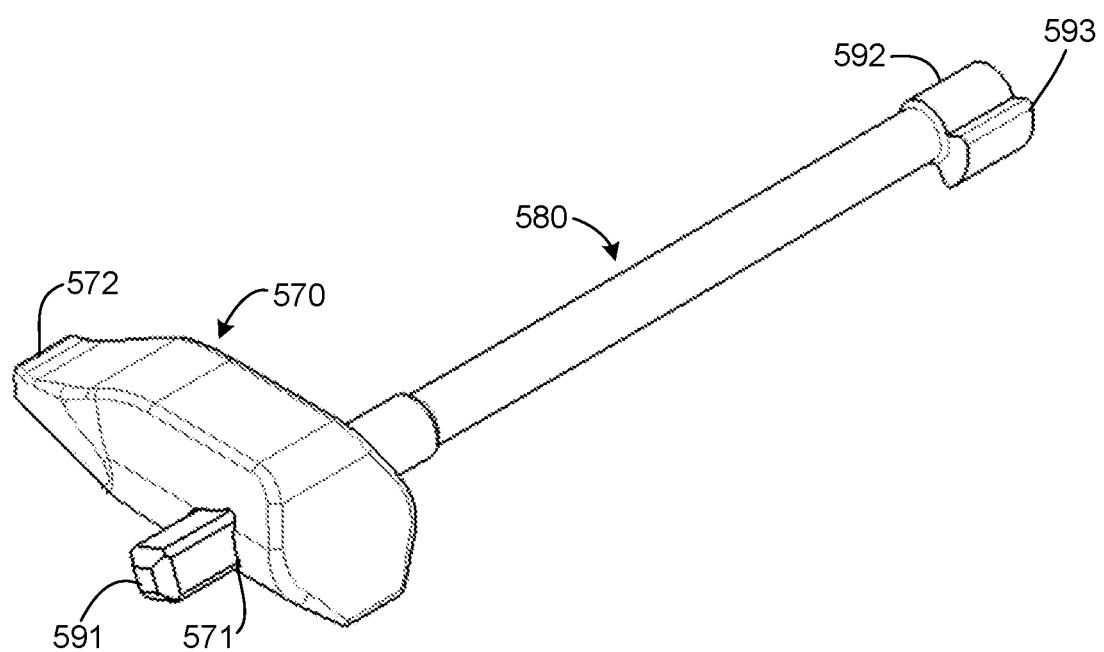
FIG. 36 is an isometric view of the latching mechanism of FIG. 34.

The torsion bar 580 and associated torsion lever 570 may have any suitable size, shape and configuration. In one embodiment, shown in FIG. 36, the torsion bar 580 has a square mounting end 591 received in a square opening 571 of the torsion lever 570, so that rotation of the torsion bar 580 also rotates the torsion lever 570. The base end 592 includes a shaped protrusion 593 that is received in the base stanchion 583 and biases the torsion lever 570 into a locked position, with the tip 572 of the lever 570 trapping a hinge rod in an open hook.

Figure 37:
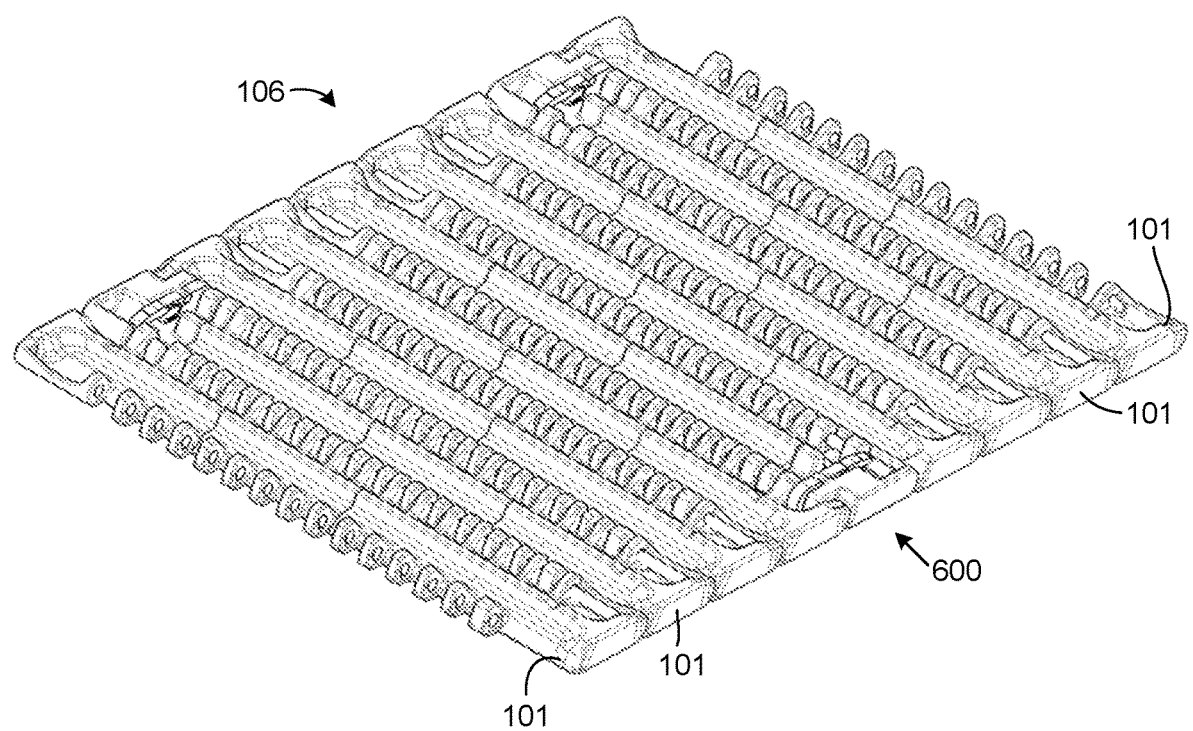
FIG. 37 is an isometric bottom view of a portion of a modular conveyor belt employing a dedicated access assembly including an openable edge portion.
Figure 38:
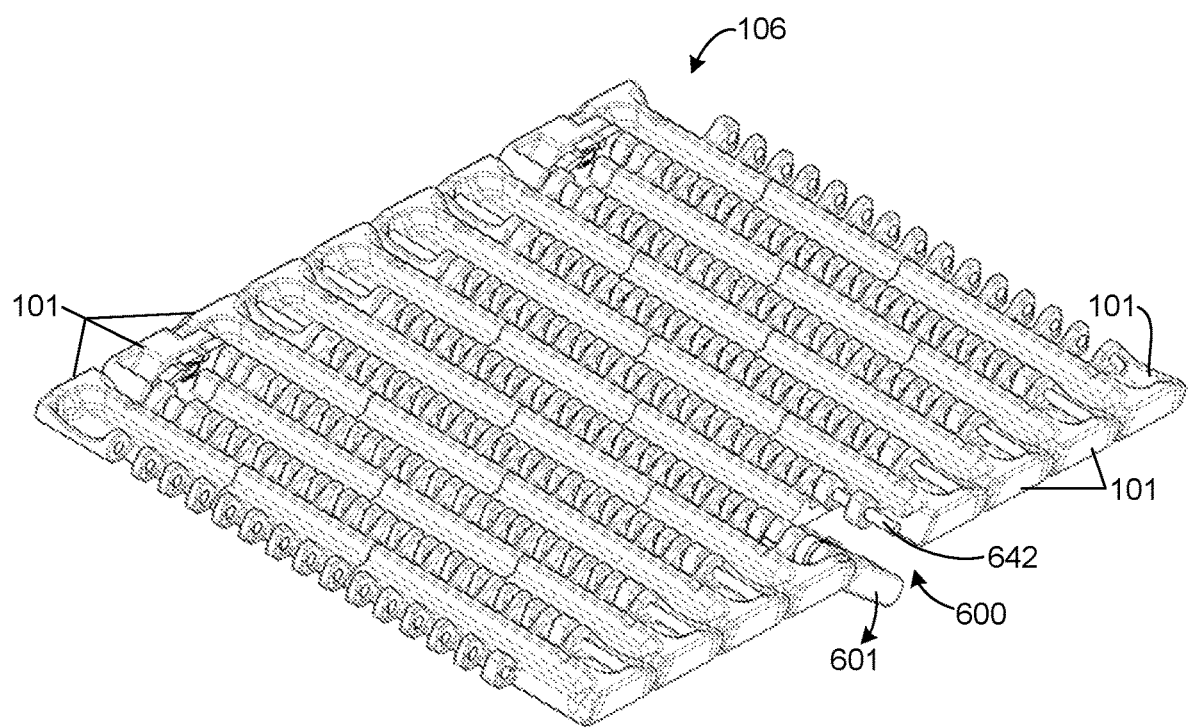
FIG. 38 is an isometric bottom view of the portion of FIG. 37 during opening of the openable edge portion to allow opening of the conveyor belt.

FIGS. 37 and 38 show another embodiment of a conveyor belt 106 employing a dedicate access assembly 600 between a series of standard modules 101 for opening and closing the conveyor belt at a dedicated location between a first row and a second row. The illustrative dedicated access assembly 600 comprises an openable edge portion 601 configured to rotate and snap into and out of engagement with a hinge rod 642 connecting two rows of the conveyor belt together to allow removal of the hinge rod 642 and separation of the two rows. The dedicated assembly 600 could alternatively comprises two rows (or portions of two rows) of non-standard modules.

Figure 39:
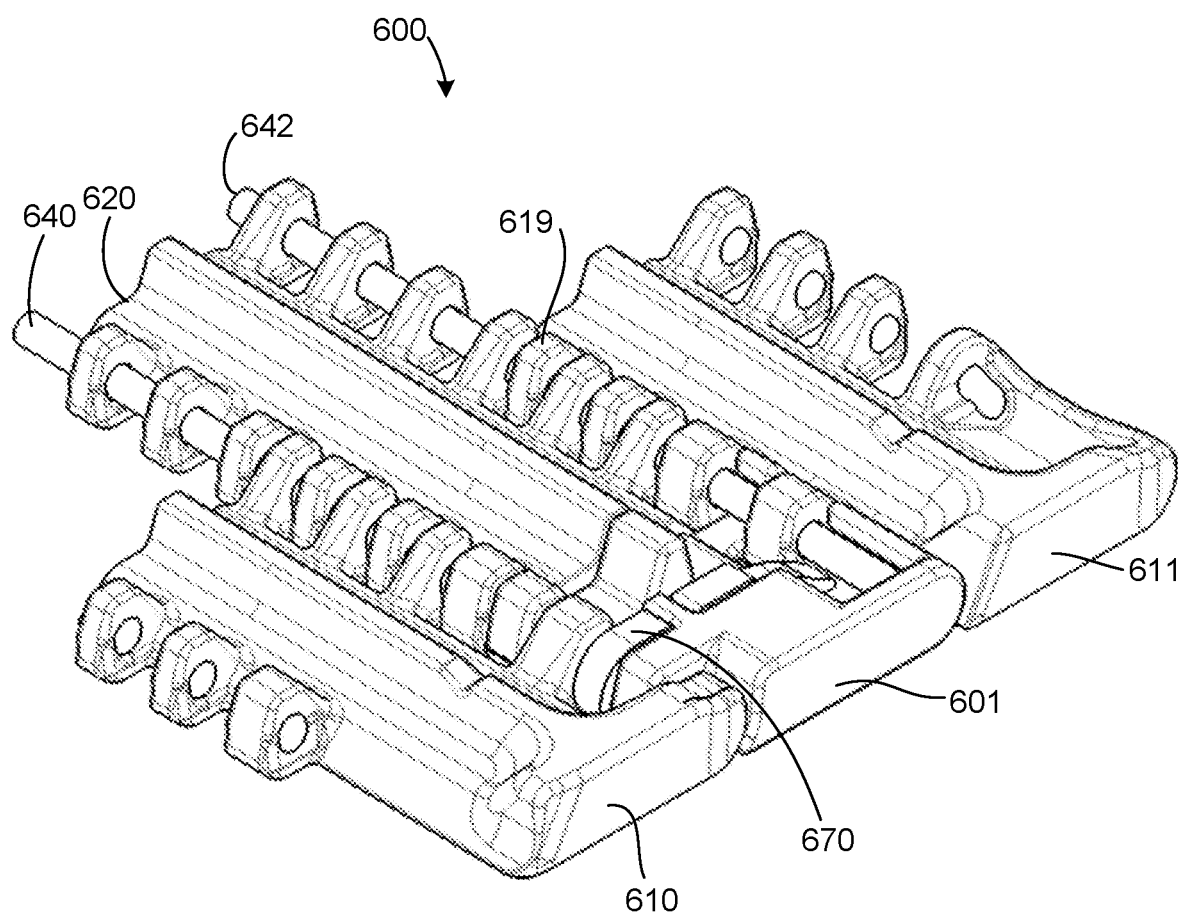
FIG. 39 is a detailed bottom view of the dedicated access assembly of FIG. 37.

FIG. 39 is a bottom view of the dedicated access assembly 600 forming a dedicated opening and—or closing point for the conveyor belt 106. The dedicated access assembly 600 spans three rows of the conveyor belt at a side edge of the conveyor belt. A first edge module 610 connects to other standard modules in the conveyor belt in an articulatable manner using hinge rods, as previously described. A first end of the first edge module 610 connects to the openable edge portion 601 via a standard hinge rod 640. The first end of the first edge module 610 also connects to an interior conveyor belt module 620 aligned with and inset from the openable edge portion 601 via the standard hinge rod 640. The interior module 620 and openable edge portion 601 connect to a second edge module 611 via removable hinge rod 642. The dedicated access assembly 600 further includes a latching mechanism 670 for selectively locking the openable edge portion 601 to the removable hinge rod 642.

Figure 40:
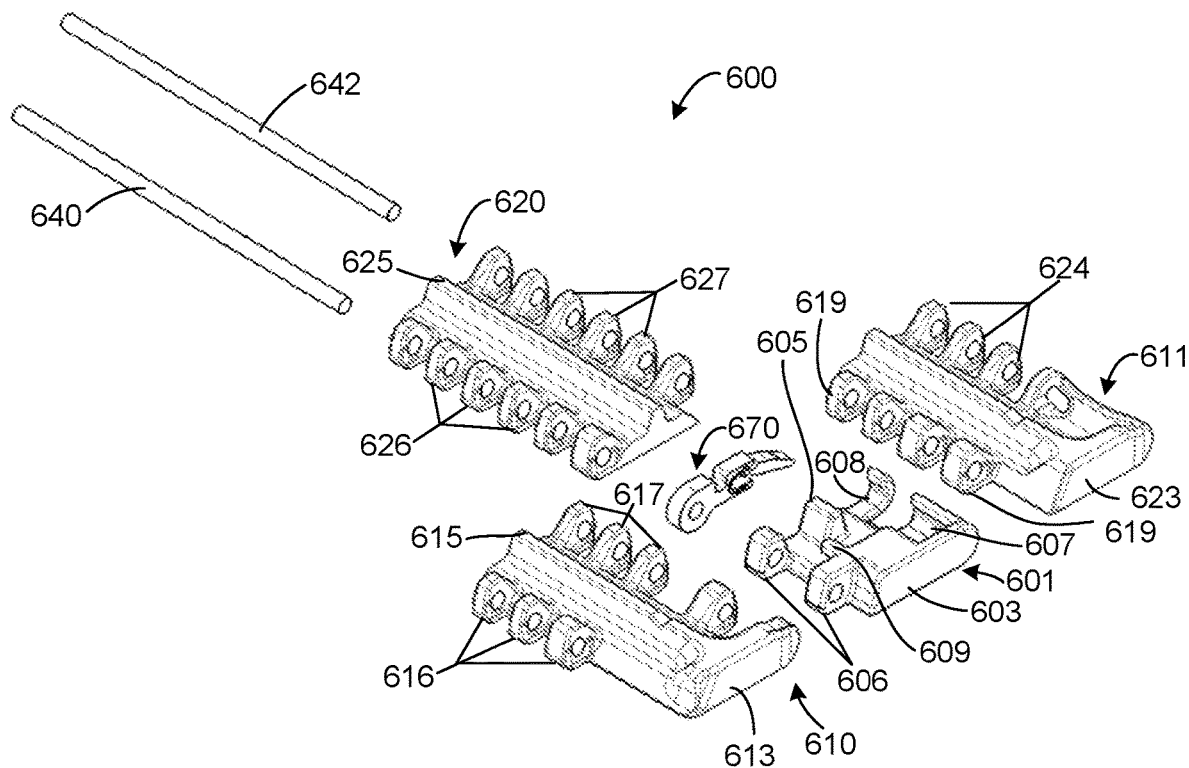
FIG. 40 is an exploded bottom view of the dedicated access assembly of FIG. 39.
Figure 41:
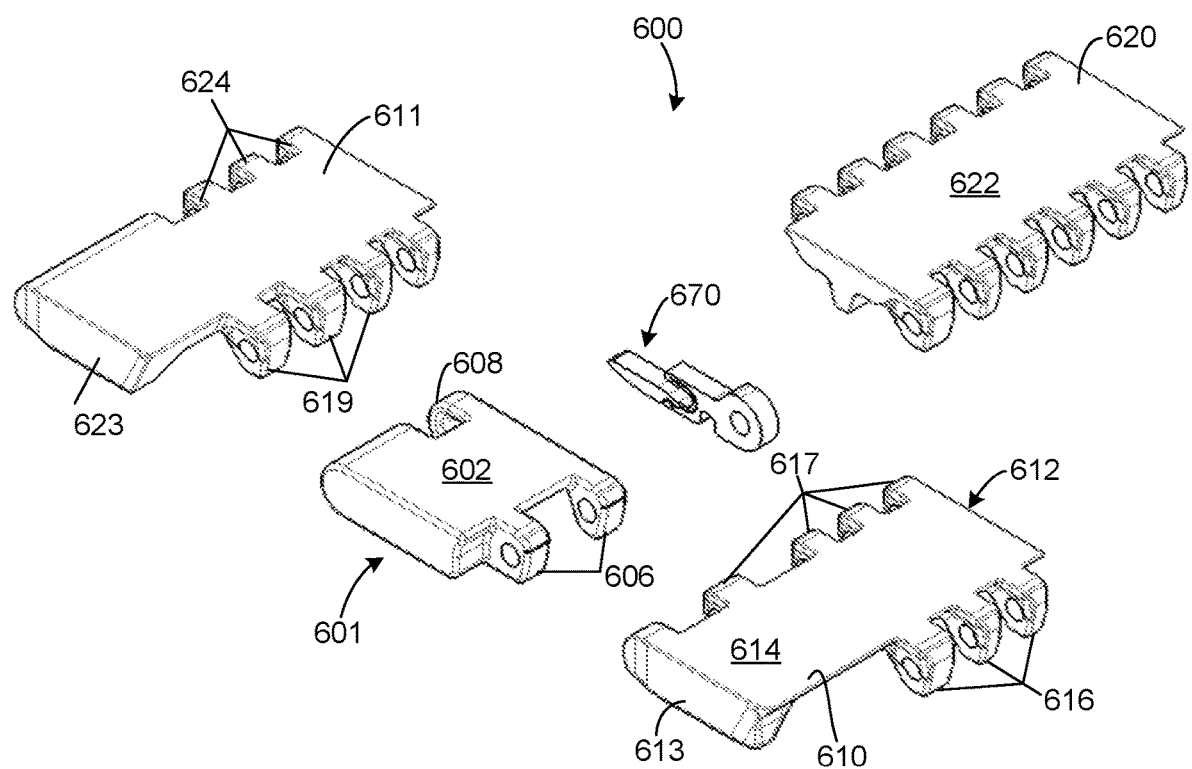
FIG. 41 is an exploded top view of the dedicated access assembly of FIG. 39.

FIGS. 40 and 41 are exploded views of the components of the dedicated access assembly 600. The illustrative first edge module 610 extends from an inner side edge 612 to a thickened outer side edge 613, has a flat top conveying surface 614 and an opposite bottom surface from which a drive element 615 extends. A series of standard hinge elements 616 configured to interlace with and connect to a series of standard hinge elements on a standard conveyor belt module extends from a first end. A series of hinge elements 617 extends from the second end, configured to engage hinge elements 606 on the openable edge portion 601.

The openable edge portion 601 includes a top conveying surface 602 and an opposite bottom surface from which a drive element 605 extends. Articulatable hinge elements 606 extend from the first end and engage the hinge elements 617 of the first edge module 601, with the hinge rod 640 extending through an aligned passageway formed by hinge elements 617, 606. A thickened outer side edge 603 includes a recess 607 at the second end in the bottom surface forming a pocket for trapping the hinge rod 642. The openable edge portion 601 also includes an open hook 608 at a second end configured to hook onto the hinge rod 642 to lock the openable edge portion 601 to the second edge module 611 and trap the hinge rod 642. The illustrative open hook 608 snap fits into and out of engagement with the hinge rod 642. The recess 607 aligns with the open hook 608. The thickened outer side edge 603 is spaced from the drive element 605 and includes a protrusion 609 for engaging the latching mechanism 670, as described below.

The second edge module 611 includes hinge elements 619 for connecting the second edge module 611 to the openable edge portion 601 and the interior module 620, a thickened outer side edge 623 and hinge elements 624 for connecting to a standard hinge module of the conveyor belt 106.

The interior module 620 includes a top conveying surface 622 and opposite bottom surface from which a drive element 625 extends, a first set of hinge elements 626 configured to align with hinge elements 617 and 606 and connect via hinge rod 640 and a second set of hinge elements 627 configured to align with the open hook 608, pocket 607 and hinge elements 619 of the second edge module. Hinge rod 642 extends through the aligned passageway formed by interleaved hinge elements 627, 619, open hook 608 and pocket 607.

In one embodiment, the openable edge portion 601 is formed from a different material than the other belt modules 610, 611, 620. For example, the openable edge portion 601 may be formed of metal or another durable material, while the other belt modules may be plastic.

Figure 42:
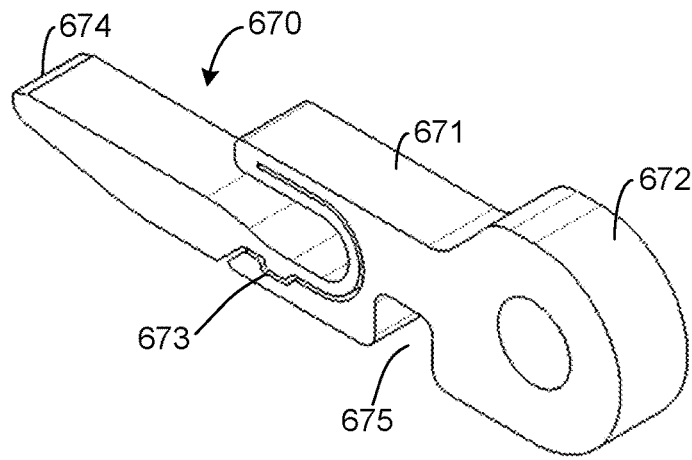
FIG. 42 is an isometric view of the latching mechanism of the dedicated access assembly of FIG. 39.

The latching mechanism 670 is configured to lock the openable edge module 601 onto the hinge rod 642. The latching mechanism 670 can be opened to allow the openable edge module 601 to rotate about the first hinge rod 640 and out of engagement with the second hinge rod 642, as shown in FIG. 38. In the unlatched position, the hinge rod 642 is exposed and can be easily removed, separating the two rows of the conveyor belt 106 held together with the hinge rod 642. The illustrative latching mechanism 670, shown in detail in FIG. 42, comprises a body 671 having a hinge element 672 at a first end for integrating the latching mechanism into the dedicated access assembly 600 by mounting the latching mechanism on the hinge rod 640. The body 671 includes a biasing mechanism, shown as a spring 673, and terminates in a tip 674. A recess 675 in a bottom surface of the body 671 seats the protrusion 609 of the openable edge portion 601.

Figure 43:
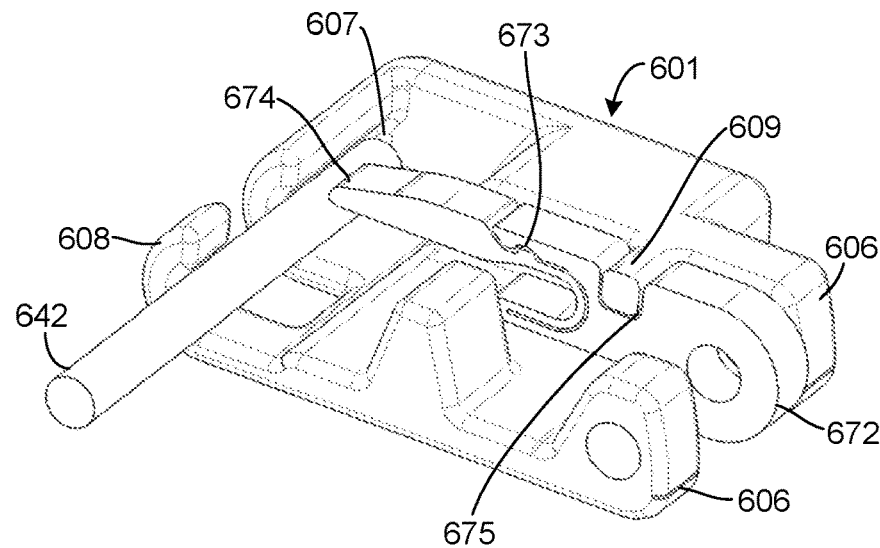
FIG. 43 shows the latching mechanism and openable end portion of FIG. 39 in a locked position relative to a hinge rod.
Figure 44:
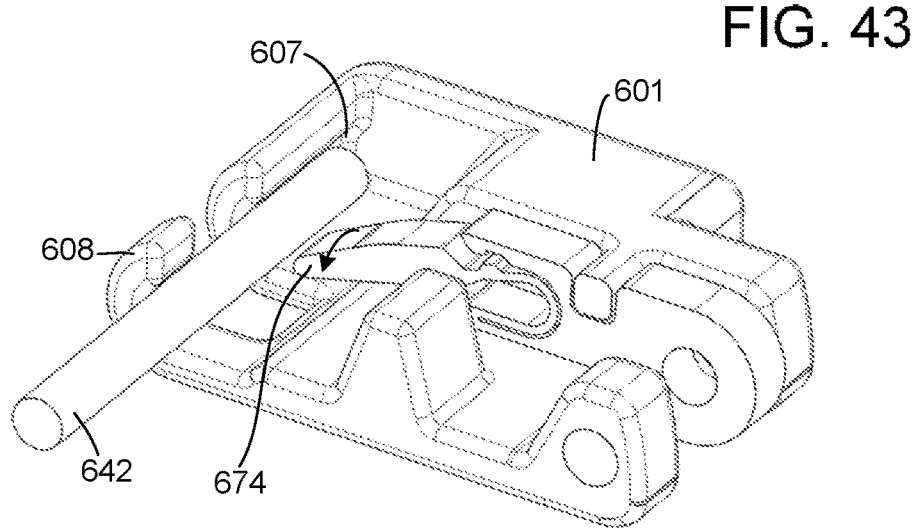
FIG. 44 shows the latching mechanism and openable end portion of FIG. 43 in an unlocked position.

As shown in FIG. 43, in a locked position, the tip 674 of the latching mechanism 670 locks the hinge rod 642 within the trapping pocket 607 and open hook 608. The spring 673 biases the tip 674 into the locked position, preventing escape of the hinge rod 642. The hinge element 672 and recess 675 maintain the position of the latching mechanism 670 relative to the openable edge portion 600.

To open the conveyor belt 106 employing the dedicated access assembly 600, a user depresses the tip 674 against the biasing mechanism 673 to allow a user to rotate the openable edge portion 601 about hinge rod 640 and out of engagement with the hinge rod 642. The thus exposed hinge rod 642 can be removed from the conveyor belt to open the conveyor belt. Conversely, a user can lock the openable edge module 601 onto the hinge rod 642 by pressing the hinge rod 642 against the tip 674 to depress the tip 674 against the biasing mechanism 673 and push the hinge rod 642 into the pocket 607 and seat of the open hook 608.

Figure 45:
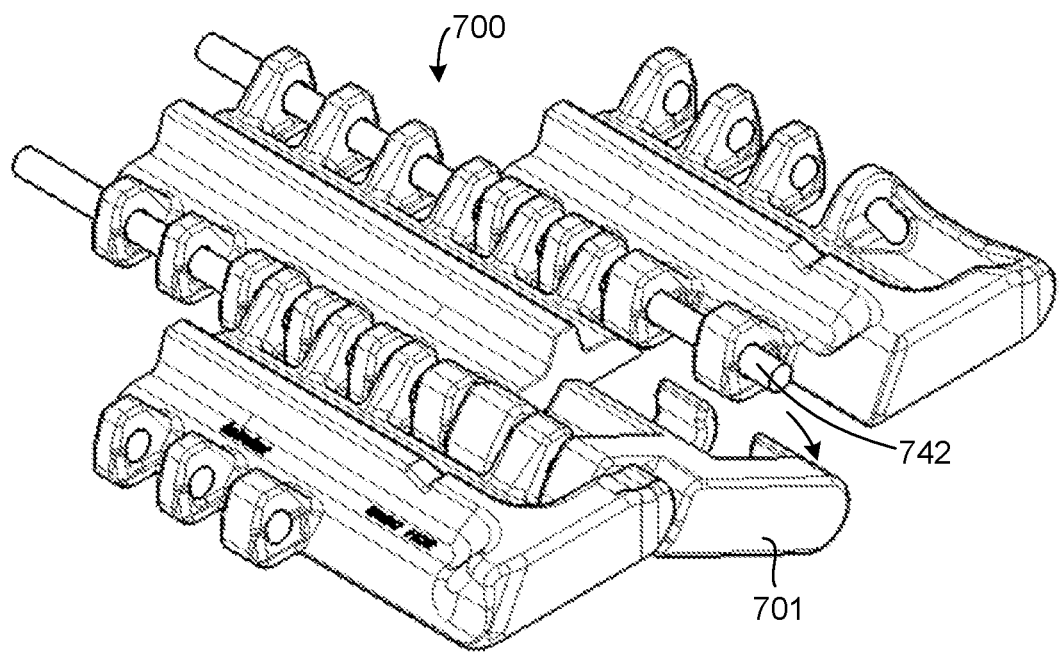
FIG. 45 is an isometric view of another embodiment of a dedicated access assembly.
Figure 46:
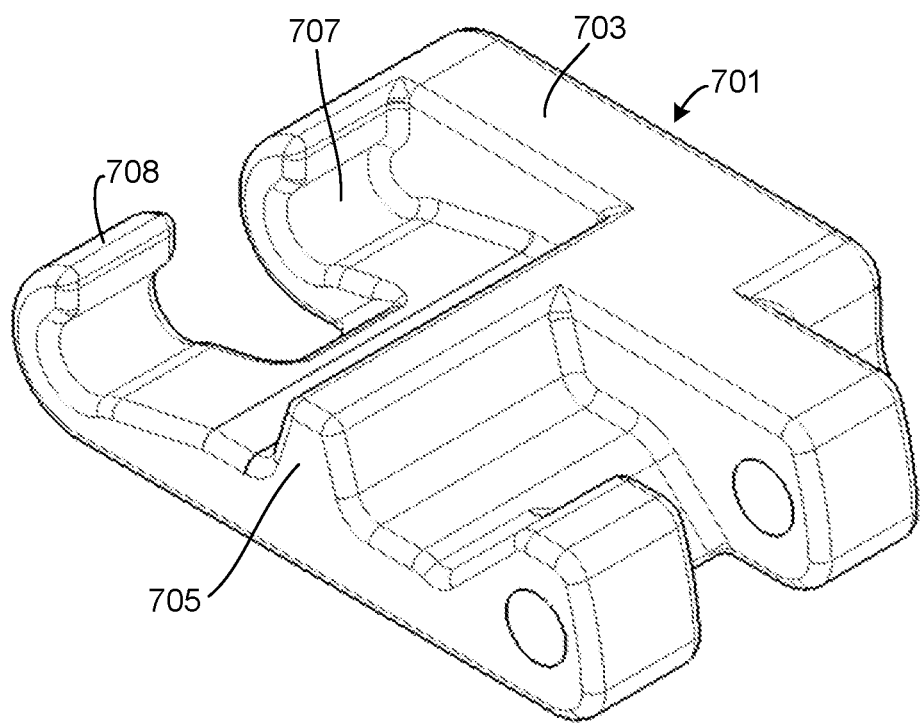
FIG. 46 is an isometric view of the openable end portion of the dedicated access assembly of FIG. 45.

In another embodiment, shown in FIGS. 45 and 46, an openable edge module 701 in a dedicated access assembly 700 omits a separate latching mechanism. Instead, a snap fit engagement between the open hook 708 and—or trapping pocket 707 lock the openable edge module 701 in place. In the embodiment of FIGS. 45 and 46, a drive element 705 on the openable edge module 701 extends to the thickened side edge 703. A user can manually push the openable edge out of engagement with the open hook 708 and trapping pocket 707 to expose the hinge rod 742 for removal.

The invention has been described relative to certain illustrative embodiments, though those skilled in the art will recognize that modifications may be made without departing from the scope of the invention.

What is claimed is:

1. A dedicated access assembly for a conveyor belt, comprising:
    at least one female portion having a body extending in height from a top conveying surface to an opposite bottom surface, in width from a first side to a second side and in length from a first end to a second end, at least one open hook extending from the first end and a series of articulatable hinge elements extending from the second end;
    at least one male portion having a body extending in height from a top conveying surface to an opposite bottom surface, in width from a first side to a second side and in length from a first end to a second end, a series of articulatable hinge elements extending from the first end and a series of linking elements on the second end having a hinge rod for releasably engaging the open hook; and
    a latching mechanism for locking the open hook onto the hinge rod, wherein the latching mechanism comprises a spring clip mounted on a mounting rod.

2. The dedicated access assembly of claim 1, wherein the spring clip comprises a body having an opening for receiving the mounting rod, the body terminating in a tip for selectively blocking the opening of the open hook and a base that contacts the bottom surface of the female portion.

3. The dedicated access assembly of claim 2, further comprising a biasing mechanism extending between the opening of the spring clip and the tip of the spring clip.

4. The dedicated access assembly of claim 3, wherein the biasing mechanism further comprises a leaf spring with an upper span extending from and parallel to the body of the spring clip, a curve near the opening and a bottom span that overlies the bottom surface of the female portion.

5. The dedicated access assembly of claim 1, wherein the female portion comprises a series of modules connected together and aligned using an alignment mechanism.

6. The dedicated access assembly of claim 1, wherein the alignment mechanism comprises a series of aligned stanchions extending from a bottom surface of each module and an alignment rod extending through the series of aligned stanchions to join the modules together, maintain their alignment and form a complete row of the conveyor belt.

7. The dedicated access assembly of claim 1, wherein the female portion comprises an openable edge portion configured to rotate about a second hinge rod extending through the articulatable hinge elements on the second end and snap into and out of engagement with the hinge rod of the male portion to selectively expose the hinge rod of the male portion.

8. The dedicated access assembly of claim 1, wherein the male portion includes rounded surfaces at the second end configured to abut shaped surfaces on the first end of the female portion.

9. The dedicated access assembly of claim 1, wherein the open hook has a round seat sized and dimensioned to seat the hinge rod and allow articulation of the portions relative to each other when the hinge rod is seated in the open hook.

10. The dedicated access assembly of claim 9, wherein the open hook includes an angled wall and an opening to the round seat that is sized so that the hinge rod can enter and exit the seat at a particular angle.

11. A dedicated access assembly for a conveyor belt, comprising:
  a first module forming an edge of the conveyor belt, the first module comprising a body, a first set of hinge elements extending from a first end for connecting to a standard conveyor belt module and a second set of hinge elements extending from a second end;
  a second module forming the edge of the conveyor belt, the second module comprising a body, a third set of hinge elements extending from a first end for connecting with the second set of hinge elements and an open hook extending from a second end;
  a third module laterally inwards of the second module, the third module comprising a body, a fourth set of hinge elements extending from a first end for connecting with the second set of hinge elements of the first module and a fifth set of hinge elements extending from a second side;
  a fourth module forming the edge of the conveyor belt, the fourth module comprising a body, a sixth set of hinge elements extending from a first end and a seventh set of hinge elements for connecting with a standard conveyor belt module;
  a first hinge rod extending through the second, third and fourth sets of hinge elements to hingedly connect the first module, second module and third modules together; and
  a second hinge rod extending through the fifth and sixth sets of hinge elements, wherein the open hook snaps onto the second hinge rod to selectively lock the second module to the second hinge rod, and the second module can pivot about the first hinge rod to disengage the second module from the second hinge rod to expose the second hinge rod for removal.

12. The dedicated access assembly of claim 11, wherein the second module includes a thickened outside edge and a recess adjacent the outer side edge forming a pocket for trapping the end of the second hinge rod.

13. The dedicated access assembly of claim 11, further comprising a latching mechanism for locking the second hinge rod within the open hook.

14. The dedicated access assembly of claim 13, wherein the latching mechanism comprises a body having a hinge element configured to receive the first hinge rod at a first end and a biasing mechanism that terminates in a tip for locking the second hinge rod within the open hook.

15. The dedicated access assembly of claim 14, wherein the latching mechanism includes a recess in a bottom surface of the body for seating a protrusion on the second module.

16. A dedicated access assembly for a conveyor belt, comprising:
  at least one female portion having a body extending in height from a top conveying surface to an opposite bottom surface, in width from a first side to a second side and in length from a first end to a second end, at least one open hook extending from the first end and a series of articulatable hinge elements extending from the second end;
  at least one male portion having a body extending in height from a top conveying surface to an opposite bottom surface, in width from a first side to a second side and in length from a first end to a second end, a series of articulatable hinge elements extending from the first end and a series of linking elements on the second end having a hinge rod for releasably engaging the open hook; and
  a latching mechanism for locking the open hook onto the hinge rod, wherein the latching mechanism comprises a body having a hinge element at a first end, a biasing mechanism and a recess in a bottom surface of the body for seating a protrusion of the female portion.

17. A dedicated access assembly for a conveyor belt, comprising:
  at least one female portion having a body extending in height from a top conveying surface to an opposite bottom surface, in width from a first side to a second side and in length from a first end to a second end, at least one open hook extending from the first end and a series of articulatable hinge elements extending from the second end;
  at least one male portion having a body extending in height from a top conveying surface to an opposite bottom surface, in width from a first side to a second side and in length from a first end to a second end, a series of articulatable hinge elements extending from the first end and a series of linking elements on the second end having a hinge rod for releasably engaging the open hook; and
  a latching mechanism for locking the open hook onto the hinge rod, wherein the latching mechanism comprises a torsion bar and a lever mounted on the torsion bar.

18. A dedicated access assembly for a conveyor belt, comprising:
  at least one female portion having a body extending in height from a top conveying surface to an opposite bottom surface, in width from a first side to a second side and in length from a first end to a second end, at least one open hook extending from the first end and a series of articulatable hinge elements extending from the second end;
  at least one male portion having a body extending in height from a top conveying surface to an opposite bottom surface, in width from a first side to a second side and in length from a first end to a second end, a series of articulatable hinge elements extending from the first end and a series of linking elements on the second end having a first hinge rod for releasably engaging the open hook;
  wherein the female portion comprises an openable edge portion configured to rotate about a second hinge rod extending through the articulatable hinge elements on the second end and snap into and out of engagement with the hinge rod of the male portion to selectively expose the hinge rod of the male portion.

* * * * *